US009632920B2

(12) United States Patent
Green et al.

(10) Patent No.: US 9,632,920 B2
(45) Date of Patent: *Apr. 25, 2017

(54) SYSTEM AND METHOD FOR A DIAGNOSTIC SOFTWARE SERVICE

(71) Applicant: Matco Tools Corporation, Stow, OH (US)

(72) Inventors: John Green, Aurora, OH (US); Kimber Biniak, Cuyahoga Falls, OH (US); Brian Katzenmeyer, Stow, OH (US); Jason Jones, Stow, OH (US)

(73) Assignee: Matco Tools Corporation, Stow, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,464

(22) Filed: May 4, 2015

(65) Prior Publication Data

US 2015/0317243 A1     Nov. 5, 2015

Related U.S. Application Data

(60) Provisional application No. 61/988,557, filed on May 5, 2014.

(51) Int. Cl.
| | | |
|---|---|---|
| *G06F 11/36* | (2006.01) | |
| *G06Q 20/12* | (2012.01) | |
| *G06F 3/0484* | (2013.01) | |
| *G06Q 20/14* | (2012.01) | |

(52) U.S. Cl.
CPC ...... *G06F 11/3688* (2013.01); *G06F 3/04842* (2013.01); *G06F 11/3692* (2013.01); *G06Q 20/127* (2013.01); *G06Q 20/14* (2013.01)

(58) Field of Classification Search
CPC ...... G06F 11/079; G06Q 20/14; G07C 5/0808
See application file for complete search history.

(56) References Cited

U.S. PATENT DOCUMENTS

| | | |
|---|---|---|
| 6,236,917 B1 | 5/2001 | Liebl et al. |
| 6,816,842 B1 | 11/2004 | Singh et al. |
| 6,845,307 B2 | 1/2005 | Rother |
| 6,874,680 B1 | 4/2005 | Klaus et al. |
| 6,947,816 B2 | 9/2005 | Chen |
| RE40,799 E | 6/2009 | Chen |

(Continued)

FOREIGN PATENT DOCUMENTS

WO      2015171502      11/2015

OTHER PUBLICATIONS

Federal Institute of Industrial Property, International Search Report and Written Opinion, Oct. 29, 2015, 10 pages, Moscow, Russia.

*Primary Examiner* — Yolanda L Wilson
(74) *Attorney, Agent, or Firm* — Hahn Loeser & Parks LLP

(57) ABSTRACT

Systems and methods for a diagnostic software service that utilizes a subscription model to distribute diagnostic software to diagnostic tools. A diagnostic application is installed on a mobile device. The mobile device communicates with an adapter which can be coupled to a vehicle. An application server provides software modules that are available to be subscribed to by a technician and, once subscribed, can be utilized via the diagnostic application. Subscription to software modules enable the technician to add and utilize specific diagnostic functionality in an a la carte manner.

27 Claims, 17 Drawing Sheets

(56) References Cited

U.S. PATENT DOCUMENTS

| | | | |
|---|---|---|---|
| 8,019,503 B2 | 9/2011 | Andreasen et al. | |
| 8,024,083 B2 | 9/2011 | Chenn | |
| 8,068,951 B2 | 11/2011 | Chen et al. | |
| 8,370,018 B2 | 2/2013 | Andreasen et al. | |
| 8,509,986 B1 | 8/2013 | Chen | |
| 8,548,674 B2 | 10/2013 | Namaky | |
| 8,600,610 B2 | 12/2013 | Bertosa et al. | |
| 8,620,511 B2 | 12/2013 | Rother | |
| 8,694,982 B2 | 4/2014 | Wempen et al. | |
| 8,880,274 B2 | 11/2014 | Chenn | |
| 9,026,400 B2 | 5/2015 | Chen et al. | |
| 9,117,319 B2 | 8/2015 | Chen et al. | |
| 9,232,077 B2 | 1/2016 | Yu et al. | |
| 2005/0113991 A1* | 5/2005 | Rogers et al. | 701/29 |
| 2006/0101311 A1 | 5/2006 | Lipscomb et al. | |
| 2006/0130033 A1* | 6/2006 | Stoffels et al. | 717/166 |
| 2008/0140281 A1 | 6/2008 | Morris et al. | |
| 2009/0112397 A1* | 4/2009 | Roberts | G07C 5/008 701/33.4 |
| 2009/0265055 A1* | 10/2009 | Gillies | 701/29 |
| 2011/0035096 A1 | 2/2011 | Liebl et al. | |
| 2012/0155285 A1 | 6/2012 | Smart et al. | |
| 2012/0173418 A1 | 7/2012 | Beardsmore et al. | |
| 2012/0269082 A1 | 10/2012 | Morper et al. | |
| 2014/0164764 A1 | 6/2014 | Pushkin et al. | |

* cited by examiner

SYSTEM AND METHOD FOR A DIAGNOSTIC SOFTWARE SERVICE

CROSS-REFERENCE TO RELATED APPLICATIONS

This application claims priority to U.S. Provisional Application Ser. No. 61/988,557, filed May 5, 2014, entitled "SYSTEM AND METHOD FOR A SUBSCRIPTION-BASED DIAGNOSTIC SOFTWARE SERVICE", the entirety of which is incorporated herein by reference.

BACKGROUND OF THE INVENTIONS

1. Field of the Inventions

This application relates generally to a diagnostic tool and diagnostic software and, more specifically, to systems and methods for provisioning diagnostic software to a diagnostic tool as a service.

2. Description of Related Art

Vehicles are equipped with sophisticated on-board diagnostic (OBD) systems capable of monitoring vehicle systems in operation, logging and transmitting real-time performance data, and performing self-diagnostics in order to detect problems with vehicles systems and to issue appropriate diagnostic test codes (DTC). A vehicle technician utilizes the OBD systems to quickly identify issues with a vehicle. To do so, the technician utilizes a diagnostic tool capable of interfacing with the OBD of the vehicle. Generally, the diagnostic tool may retrieve DTCs set by the vehicle, obtain real-time data associated with one or more parameter identification numbers (PIDs), and, in some cases, program modules (e.g., the engine control unit (ECU) or powertrain control module (PCM)) of the vehicle according to various performance profiles.

While a set of industry standard DTCs and PIDs are implemented in many vehicles, manufacturers typically utilize non-standard or manufacturer-specific parameters and codes. Accordingly, a diagnostic tool requires software capable of addressing the proprietary parameters and deciphering the codes in order for a technician to efficiently diagnose vehicles problems. Due to the proprietary nature of the manufacturer-specific parameters and codes, diagnostic tool software comes at a great cost, which in turn increases the cost of the diagnostic tools themselves. Moreover, because the proprietary extensions to the standard DTCs and PIDs are under direct control of the manufacturers, these non-standard codes and parameters can be different between different models produced by one manufacturer and/or may change between model years for the same model. As such, software updates for diagnostic tools become necessary for technician to properly maintain newer vehicle models. Often, these software updates carry a high cost substantially equivalent to the initial software investment. In extreme cases, software updates may not be supported by a particular diagnostic tool. In these cases, technician would purchase a new diagnostic tool to work with the newer vehicle models.

In view of the expense of conventional diagnostic tools and/or the software for the tools, repair shops often have only one diagnostic tool available for use by several technicians. Such sharing arrangements often lead to reduced revenue for the repair shops and the technicians since time is lost when the shared diagnostic tools are unavailable, i.e., some technicians cannot continue to work while other technicians are utilizing the tools.

BRIEF SUMMARY OF THE INVENTIONS

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, a diagnostic software service provides cost effective distribution and utilization of software for diagnostic tools. The service enables technicians to purchase access to diagnostic software in the form of discrete uses, leases, subscriptions, or other forms of access. The purchased access can be configured to cover a range of makes and models as desired or as needed by the technicians. Using a configurable and customizable access model, high, up-front costs of software to analyze proprietary codes and parameters unique to specific manufacturers and/or models are avoided. Rather, access (e.g., discrete uses, leases, subscriptions, etc.) to software for one or more makes, models, model years, or manufacturing groups (i.e., foreign makes, domestic makes, German makes, Japanese makes, etc.) is purchased based on need. Moreover, the software service enables lower cost mobile tools to be utilized with the diagnostic software. Thus, technicians are provided an affordable diagnostic tool without having to share the diagnostic tools with other technicians in order to also share the cost.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTIONS

General Overview

Figure 1:
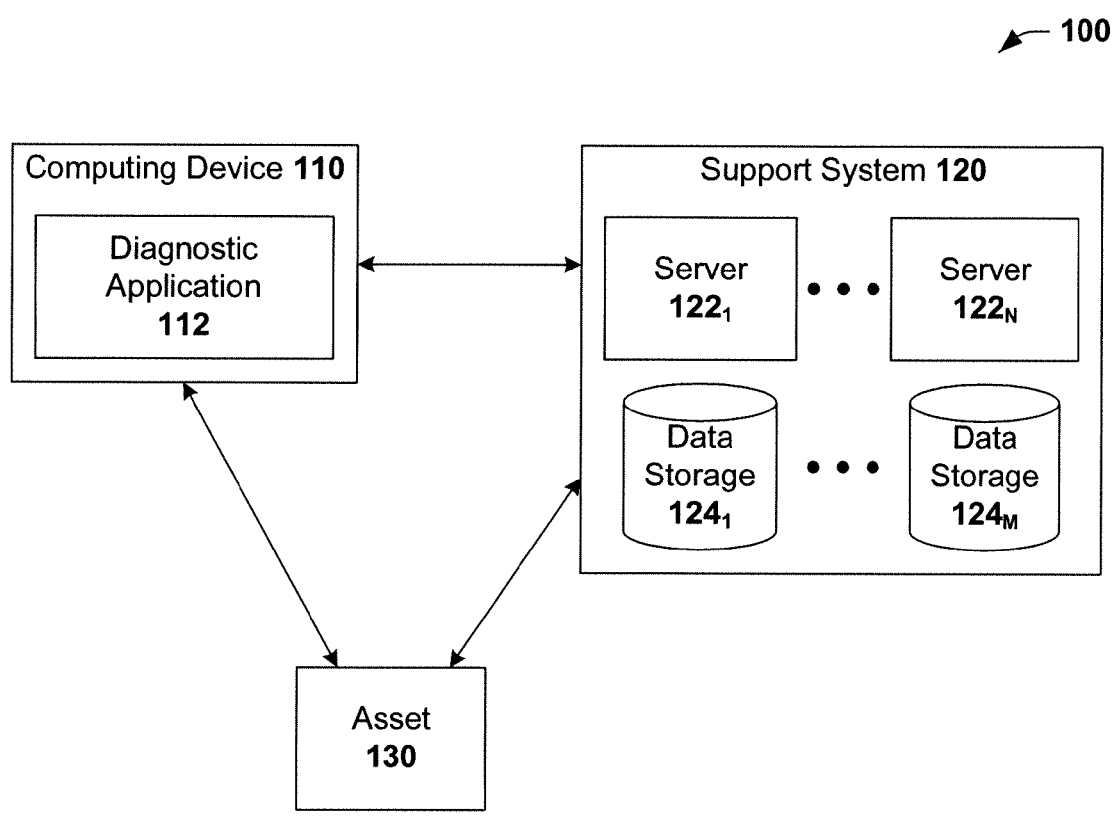
FIG. 1 is a block diagram of an exemplary, non-limiting embodiment for a diagnostic software service according to one or more aspects.

As discussed in the background, conventional diagnostic tools such as handheld or portable diagnostic computers or tablet devices can be expensive due in part to a high cost for software licenses associated with diagnostic software installed on the tools. As computing technology advances, computing devices generally trend towards lower cost for a given performance. However, while hardware associated with the diagnostic tools can become lower cost, the software licenses for the software continue to maintain an overall high cost for the tools. This high cost, in turn, creates a prevalence for technicians to share diagnostics tools within a repair shop, thus, reducing overall revenue generation.

Moreover, non-standard or manufacturer-specific diagnostic parameters or features may vary between manufacturers, between models from a particular manufacturer, and even between a particular model having different packages. That is, different vehicles may have different subsystems and/or diagnostic requirements. Accordingly, to troubleshoot, diagnose, analyze, or modify these vehicles, particular software configured for peculiarities of the vehicles is utilized. A full library of all such software can be extensive.

In various, non-limiting embodiments, a system and associated methods are provided for a diagnostic software service that utilizes an access model predicated on customizability to distribute or utilized diagnostic software via diagnostic tools. A diagnostic application is installed or executed on one or more computing devices. That is, the diagnostic application may be installed and executed on a single computing device, or distributed across multiple computing devices, servers, or other systems. For instance, functionality of the diagnostic application may be associated with particular functional modules or application portions that are distributed such that different modules are accessed, executed, and/or utilized via disparate computing devices.

A computing device, as utilized herein, can include an electronic machine including at least a computer processor and/or a computer memory. Exemplary computing devices include, without limitation, a personal computer (e.g., desktop or notebook computer), a mobile device (e.g., smartphone, tablet device, a personal digital assistant, or substantially any portable, movable computing device), a wearable computing device (e.g., device having an optical head-mounted display, a wrist-mounted device, etc.), a server computer, and/or embedded computing devices of assets.

The diagnostic application implements a service that enables access to or operation of diagnostic software in a customizable and cost-effective manner. As utilized herein, "diagnostic software" refers to software that, when executed, facilitates collection and analysis of data associated with an asset to be serviced or repaired. Diagnostic software, as utilized herein, can also provide servicing or repair procedures for an identified issue. Further, diagnostic software includes software for configuring asset parameters and/or programming asset systems to achieve a desired operation. In an aspect, diagnostic software can be asset-specific such that particular asset types, manufacturers, models, and/or model varieties have corresponding diagnostic software to achieve the aforementioned functionality. Such diagnostic software, as described herein, may be selected, distributed, purchased, accessed, etc. as discrete, individual units or as packages of a plurality of units. For instance, diagnostic software associated with a particular manufacturer and particular model of an asset can be utilized in accordance with the systems and methods herein. In another example, diagnostic software for all asset models of the particular manufacturer may be utilized and managed as a package. Other packages may be constructed or customized based on a variety of criteria to suit the desires of a user.

An asset, as utilized herein, can include a mobile or fixed asset having serviceable, repairable, or modifiable components. In general, an asset, or components thereof, record or generate data indicative of an operation of the asset. The data can specify operational parameters, operational conditions, error codes, performance data or logs, or other information related to a configuration, operation, or performance of an asset. In one exemplary embodiment, an asset can be a vehicle such as a motor vehicle or other transportation machine such as an airplane, helicopter, rail vehicle, watercraft, etc.

A technician, as utilized herein, refers to an entity performing maintenance, repair services, modifications, upgrades, inspections, or other activities with respect to an asset. A technician may conduct such activities as a professional service. However, a technician, as utilized herein, includes non-professional entities such as hobbyists and other do-it-yourself, self-sufficient people. Generally, a technician is any person conducting a task with respect to an asset in which it is desirable to have access to data (e.g., performance data, operational data, configuration data, trouble codes, etc.) or an ability to modify programmable or configurable aspects of the asset.

In one embodiment, a mobile device for use by a technician for motor vehicle maintenance is described herein. The mobile device includes a user interface, a display, and a processor coupled to a computer-readable storage medium on the mobile device. The computer-readable storage medium stores computer-executable instructions for a subscription software application for use in the maintenance of a motor vehicle. The subscription software application, when executed by the processor, configures the processor to output, on the display, a catalog of diagnostic software modules available for utilization by the technician for analysis of vehicle data associated with the motor vehicle. The subscription software application further configures the processor to receive, via the user interface, a selection of a desired diagnostic software module from among the catalog of diagnostic software modules. In addition, the subscription software application configures the processor to receive a commitment of payment for access to the desired diagnostic software module. The subscription software application configures the processor to communicate the selection of the desired diagnostic software module to a first remote system and to communicate the commitment of payment to a second remote system. The subscription software application further configures the processor to enable operation, in response to an authorization signal, of the desired diagnostic software module, via the mobile device, for generating an analysis result from an analysis of at least a portion of the vehicle data and for outputting the analysis result to the display.

In one example, the first and second remote systems constitute a single remote system such that the subscription software application configures the processor to communicate the selection of the desired diagnostic software module and the commitment of payment to the single remote system. In another example, the first remote system and the second remote system are two different remote systems.

The mobile device can further include a communication interface for receiving data associated with a motor vehicle. The communication interface, in one example, can include a receiver configured to receive the vehicle data transmitted by at least one control unit of the motor vehicle. In another example, the communication interface is configured to receive at least some of the vehicle data from data storage remote from the motor vehicle. In yet another example, the communication interface includes a receiver configured to receive at least some of the vehicle data associated with the motor vehicle transmitted by a vehicle communication interface operatively coupled to the motor vehicle.

The subscription software application further configures the processor to receive the desired diagnostic software module, as a download from remote data storage, and to store the desired diagnostic software module on the computer-readable storage medium of the mobile device. However, in another aspect, the desired diagnostic software module is stored on the computer-readable storage medium of the mobile device such that only when the mobile device receives the authorization signal is access granted for the use of the desired diagnostic software module via the mobile device. The authorization signal enables the operation of the desired diagnostic software module for a predetermined number of uses or for a predetermined period of time.

In another example, the subscription software application further configures the processor to: communicate, to a remote server, a request for analysis of at least some of the vehicle data by the desired diagnostic software module; receive analysis results from the remote server at the mobile device; and output the analysis results to the display.

According to another embodiment, computer-readable media having store thereon computer-executable instructions for a diagnostic software service for use in maintenance of a motor vehicle is described. The computer-executable instructions include a first set of instructions for the diagnostic software service that, when executed by a first processor, configures the first processor to: (1) display a catalog of diagnostic software modules available for use to analyze vehicle data associated with the motor vehicle and to generate analysis results adapted for use in maintenance of the motor vehicle, (2) receive a selection of a desired diagnostic software module from among the catalog of diagnostic software modules available, and (3) communicate the selection of the desired diagnostic software module to a first remote system. The computer-executable instructions can also include a second set of instructions for the diagnostic software service that, when executed by a second processor, configures the second processor to: (4) receive a commitment of payment for access to the desired diagnostic software module, and (5) communicate the commitment of payment to a second remote system. In addition, the computer-executable instructions include a third set of instructions for the diagnostic software service that, when executed by a third processor, configures the third processor to: (6) receive vehicle data associated with a motor vehicle, and (7) operate the desired diagnostic software module to analyze the vehicle data to generate analysis results adapted for use in the maintenance of the motor vehicle. Further, the computer-executable instructions include a fourth set of instructions for the diagnostic software service that, when executed by a fourth processor, configures the fourth processor to (8) receive the analysis results generated from analysis of the vehicle data, and (9) output the analysis results to a display associated with the fourth processor and adapted for viewing by vehicle maintenance technician personnel when located adjacent the motor vehicle.

According to an example, the fourth set of instructions are executable by a processor of a mobile device having a user interface and a display, the processor of the mobile device constituting at least the fourth processor. The first set, the second set, the third set, and the fourth set of instructions are respectively stored on a computer-readable storage medium to be executable by a single processor constituting the first processor, the second processor, the third processor, and the fourth processor. In another example, the first set, the second set, the third set, and the fourth set of instructions are respectively stored on one or more computer-readable storage media so as to be executable by one or more processors respectively associated with one or more computing devices, the one or more processors respectively constituting one or more of the first processor, the second processor, the third processor, or the fourth processor. In yet another example, the computer-executable instructions include a fifth set of instructions of the diagnostic software service that, when executed by a fifth processor, configures the fifth processor to enable operation of the desired diagnostic software module responsive to the selection of the desired diagnostic software module and the commitment of payment.

According to a further embodiment, a computer-readable storage medium having stored thereon computer-executable instructions for enabling operation of a diagnostic software module for use in maintenance of a motor vehicle is described. The computer-executable instructions include a software application that, when executed by a processor, configures the processor to: output a catalog of diagnostic software modules available for utilization by a vehicle maintenance technician for analysis of vehicle data associated with a motor vehicle; receive a selection of a desired diagnostic software module from among the catalog of diagnostic software modules; receive a commitment of payment for access to the desired diagnostic software module; and enable operation of the desired diagnostic software module via a mobile electronic communication device having a user interface and a display, to generate analysis results based on at least a portion of the vehicle data for output to the display of the mobile device.

In an example, the software application is executable by a computer processor of a computing device distinct from the mobile device. In another example, the software application is executable by a computer processor of the mobile device. Pursuant to this example, the software application further configures the computer processor of the mobile device to receive an authorization signal and to enable access to the desired diagnostic software responsive to the authorization signal. Further, the software application configures the computer processor of the mobile device to receive, with a communication interface of the mobile device, at least a portion of the vehicle data transmitted from the motor vehicle. In addition, the software application configures the computer processor of the mobile device to obtain at least some of the vehicle data from data storage remote from the motor vehicle.

In another example, the software application further configures the processor to: communicate the selection of the desired diagnostic software module to a first remote system; and communicate the commitment of payment to a second remote system. The software application further configures to the processor to communicate an identifier associated with the mobile device to at least one of the first remote system or the second remote system to enable the operation of the diagnostic software via the mobile device. In one example, the first and second remote systems constitute a single remote system such that the software application further configures the processor to communicate the selection of the desired diagnostic software module and the commitment of payment to the single remote system. In addition, the software application further enables the processor to communicate a signal for authorization to debit an amount from an account of credits, constituting the commitment of payment, with a credit being exchangeable for access to the desired diagnostic software module.

According to a further example, the software application enables the processor to communicate a request to a server configured to support the operation of the desired diagnostic software module, the request instructing the server to enable access to the desired diagnostic software module via the mobile device.

The commitment of payment is indicative of a monetary sum that enables a predetermined number of uses of the desired diagnostic software module. In another example, the commitment of payment is indicative of a monetary sum that enables use of the diagnostic software module for a predetermined period of time.

In yet another embodiment, a computer-readable storage medium having stored thereon computer-executable instructions for a diagnostic software service hosted on a remote server for use in maintenance of a motor vehicle is described herein. The computer-executable instructions comprising a software application. The software application is configured to be executed by a processor to enable the processor to: receive a selection of a desired diagnostic software module from a catalog of available diagnostic software modules; receive a commitment of payment for use of the desired diagnostic software module; receive vehicle data associated with a motor vehicle; analyze the vehicle data to generate analysis results via the desired diagnostic software module; and communicate the analysis results to a display of a mobile electronic communication device and adapted for viewing by vehicle maintenance technician personnel when located adjacent the motor vehicle.

An overview of some embodiments for an subscription-based diagnostic software service has been presented above. As a roadmap for what follows next, a framework for a diagnostic software service is described in more detail. Thereafter, one exemplary diagnostic software service is described. Afterwards, an exemplary computing device and computing environment, in which such embodiments and/or feature described above can be implemented, are described. The above noted features and embodiments will be described with reference to the drawings, wherein like reference numerals are used to refer to like elements throughout.

Diagnostic Software Service

As mentioned above, in various embodiments, a diagnostic service enables utilization of software for diagnostic, repair, or modification of an asset in a customizable fashion. Technicians may acquire access to customized sets of software features covering functionality respectively desired by each technician. The customized sets of software can expanded and reduced, as desired, and individual software modules included in the sets remain accessible for a duration of time, a number of uses, or subject to a recurring payment structure. Thus, the diagnostic software service provides software access that is adjustable to changing needs of technicians.

FIG. 1 shows a block diagram illustration an exemplary, non-limiting embodiment of a diagnostic software service. Specifically, FIG. 1 illustrates a system 100, which can implement the diagnostic software service. System 100 may include a computing device 110 having a diagnostic application 112 thereon. The computing device 110 communicates with support system 120 configured to support operation of the diagnostic application 112 via the computing device 110. For instance, the support system 120 can receive payment information, process payments, obtain selections of particular diagnostic software, and enable operation of the particular diagnostic software via the computing device 110. Further, the support system 120 can manage access to software in accordance with service agreements (e.g., subscriptions, etc.), download software modules to the computing device 110, push support data for diagnostic application 112 to the computing device 110, push software updates to diagnostic software on the computing device 110 or diagnostic application 112 itself, and other functions described herein.

As shown in FIG. 1, support system 120 may include one or more servers such as server $122_1$ to server $122_N$, where N is any integer greater than or equal to one. Support system 120 may also include one or more data storage devices such as data storage $122_1$ through data storage $122_M$, where M is any integer greater than or equal to one. Server 122 and data storage 124 can be accessed via a network (e.g., local area network or wide area network), or available for communication as Internet-based services. For instance, server 122 and/or data storage 124 can implement a cloud-based or web-based service accessible via web protocols or application program interfaces (APIs). Server 122 may include data storage 124 such that data storage 124 is a component of server 122. According to another aspect, data storage 124 can be a separate storage server providing a data storage service utilized by server 122 or computing device 110.

System 100 may also include an asset 130 analyzed via computing device 110. Specifically, diagnostic application 112 utilizes diagnostic software, corresponding to asset 130, to analyze asset data and generate analysis results. The analysis results are employable to troubleshoot problems with the asset 130, to diagnose conditions of the asset 130, to monitor operation of the asset 130, to track performance of the asset 130, and/or to modify parameters or programs of asset 130.

In the embodiment of FIG. 1, a localized implementation of diagnostic application 112 is illustrated. According to this embodiment, a majority of functionality associated with diagnostic application 112 is executed and/or accessed via computing device 110. By way of example, diagnostic application 112, when executed by computing device 110, outputs a catalog of diagnostic software modules available for utilization by a user for analysis of data associated with assets, such as asset 130. The catalog can be output to a display device associated with computing device 110, for instance. A selection of a desired diagnostic software module from the catalog can be input by the user to the computing device 110. In an aspect, the desired diagnostic software module can be particular module corresponding to asset 130. The desired diagnostic software module may be selected individually or be included a group of modules selected. For instance, a group of diagnostic software modules corresponding to assets from a specific manufacturer may be selected as a whole. Diagnostic software modules can be grouped by model (i.e. all versions of a model), by manufacturer, by asset type, by geographical association (i.e., European, Asian, American, etc.), by asset subsystem, by date of manufacture, or the like.

After selection, the desired diagnostic software module is operable via the computing device 110 to analyze data from asset 130. The data can be communicated by asset 130 directly to computing device 110. Alternatively, the data can be communicated to computing device 110 by an asset communication interface removably coupled to asset 130. For instance, for motor vehicle assets, a vehicle communication interface can be attached to the vehicle via an on-board diagnostic (OBD) connector. The vehicle communication interface can transmit data to the computing device 110.

In a further aspect, operation of the diagnostic software module selected is enabled by support system 120. For example, computing device 110 can transmit the selection of the diagnostic software module to a server 122 of support system 120. The server 122 receiving the selection can download the diagnostic software module to the computing device 110. The diagnostic software module can be stored on data storage 124, retrieved by server 122, and communicated to computing device 110. In another example, the diagnostic software module can be resident on the computing device 110. Upon selection, the server 122 can communicate an authorization signal to the computing device 110 to allow access to the diagnostic software module. Further, the computing device 110 can unlock the module upon selection.

Moreover, selection of the diagnostic software module can be paired with a commitment of payment. The commitment of payment can be information specifying terms of access to the diagnostic software module and/or an acceptance of those terms of access by a user. The terms of access can include payment terms such as form of payment, amount of payment, and/or schedule of payment. Further, the terms of access can specify constraints on access such as a number of uses of the diagnostic software module available or a period of time to which access is enabled. The terms of access can also delineate a subscription having a subscription period during which access is enabled. The subscription period may renew upon recurring payment in accordance with the payment terms.

The commitment of payment for access to the diagnostic software module can be communicated to a server 122 of support system 120. The server 122 receiving the commitment of payment may be the same server 122 receiving the selection of the diagnostic software module. In another example, disparate servers 122 respectively receive the commitment of payment and the selection of diagnostic software module. For instance, a first server $122_1$ may be configured to provide software management services. As such, the first server $122_1$ receives the selection of the desired diagnostic module and downloads the selected module to the computing device 110. The selected module can be retrieved from data storage $124_1$, associate with server $122_1$, and communicated to the computing device 110. In the case of modules pre-stored on computing device 110, the first server $122_1$ communicates an authorization signal or activation signal to the computing device 110. The diagnostic application 112, responsive to the signal, unlocks the selected module for execution by computing device 110. A second server $122_2$ of support system 120 receives the commitment for payment. Accordingly, the second server $122_2$ can process payment and communicate to the first server $122_1$ to authorize or enable access to the selected module. The second server $122_2$ can further manage the terms of access specified in the commitment for payment and signal the first server $122_1$ to disable access responsive to failed payment, exhaustion of a contracted number of uses, expiration of contracted period of time, etc. The second server $122_2$ can store the commitment of payment in data storage $124_2$ to facilitate management of access terms.

In yet another aspect, features and implementing functionality of the diagnostic software service described herein can be localized to the computing device 110. The diagnostic software application 112 stored and executed by the computing device 110 implements the diagnostic software service without reliance on specialized components of support system 120 to enable the service. The diagnostic software application 112 can include the catalog of diagnostic software modules and the diagnostic software application 112 can unlock or enable a particular module upon selection and confirmation of purchase. Further, the diagnostic software application 112 can maintain the confirmation of payment, including the terms of access and payment terms, and manage access to the diagnostic software modules accordingly. In one example, the diagnostic software application 112 can leverage the operating and/or programming environment of the computing device 110 and utilize existing features included therein. For instance, the diagnostic software application 112 can access digital wallet or payment systems incorporated in the computing device 110 (i.e., included as features of an operating system or programming environment of the computing device 110). The existing wallet or payments systems available to any application executed by the computer device 110 can be utilized by the diagnostic software application 112 to effectuate payment processing according to the payment terms. In addition, many computing environment include a digital distribution platform (e.g. a software or application marketplace). Such a platform may be leveraged to install the diagnostic software application 112 to the computing device 110. Further, the digital distribution platform can provide updates to the diagnostic software application 112. The updates may include modifications to the diagnostic software application 112 as well as updates or changes to diagnostic software modules accessible therefrom. In accordance with this example, support system 120 can provide general services associated with payment processing and/or digital distribution. These services, according to this aspect, are not specialized to the diagnostic application 112, and can be generally available to a wide range of client systems.

Figure 2:
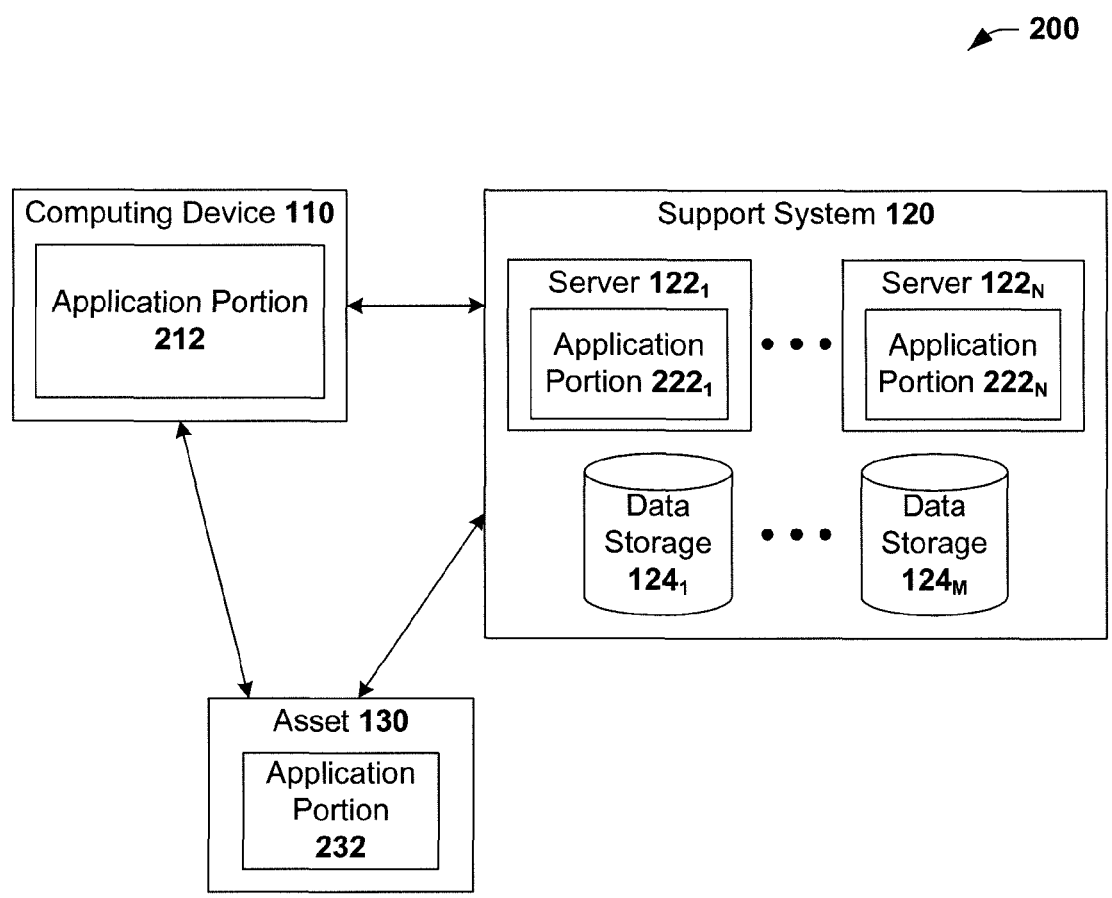
FIG. 2 is a block diagram of an exemplary, non-limiting embodiment for a diagnostic software service according to one or more aspects.

Turning to FIG. 2, illustrated is another exemplary, non-limiting embodiment of a diagnostic software service implemented by system 200 according to an aspect. System 200 implements the diagnostic software service in a distributive manner such that functionality of diagnostic application 112, for example, is carried out by disparate devices. As shown in FIG. 2, computing device 110, server 122, and asset 130 include respective application portions 212, 222, and 232. These portions implement subsets of functionality of the diagnostic software service, or more specifically, diagnostic application 112 by which the diagnostic software service is accessed and consumed. Thus, diagnostic application 112, according to this embodiment, is not a monolithic software application. Rather, the diagnostic application 112 includes a collection of separate, but interrelated, components coordinating together to deliver the diagnostic software service.

A division of functionality among computing device 110, support system 120, and asset 130 is not limited to any specific arrangement. Based on respective capabilities, certain functionality can be shifted from one device to another to improve efficiency or enhance performance. Other considerations, however, may influence a distribution of components such as ease of implementation, maintenance of confidentiality of proprietary components, system and data security, and any other factors that compel organization in a particular way.

According to one or more examples, application portion 232 associated with asset 130 can collect asset data. The application portion 232 can communicate the asset data to the application portion 212 of computing device 110, or to a remote system configured to receive and store asset data for later access. For instance, server 122 with application portion 222 can receive asset data from asset 130 and make the asset data available for retrieval or analysis. The asset data can be retrieved by application portion 112 of computing device 110 for analysis by diagnostic software modules stored thereon. Alternatively, server 122 can execute diagnostic software modules, stored by data storage 124 for example, to generate analysis results from the asset data on behalf of the computing device 110. Server 122 can communicate the analysis results to the computing device 110 in response to a request. In this example, the server collecting and managing asset data may be a different server from that which generates analysis results based on the asset data. Alternatively, a single server may execute both functions.

Still further, the diagnostic software module can be resident on asset 130 and executed on asset 130 to generate analysis results. Accordingly, asset 130 communicates analysis results as opposed to asset data. Similar to the asset data described above, the analysis results can be communicated from the asset 130 to support system 120 and/or computing device 110. As the computing device 110 is configured for use directly by a technician, the analysis results can be displayed on the computing device 110 for viewing by the technician. Thus, when transmitted from the asset 130 to support system 120, the support system 120 can thereafter communicate the analysis results to the computing device 110 upon request. Further, the asset 130 can include a display, such as a center console display, on which the analysis results can be displayed. Accordingly, in some examples of system 200, the computing device 110 may be redundant. That is, a computer system of asset 130 can execute functionality performed by computing device 110 in other examples described herein.

Figure 3:
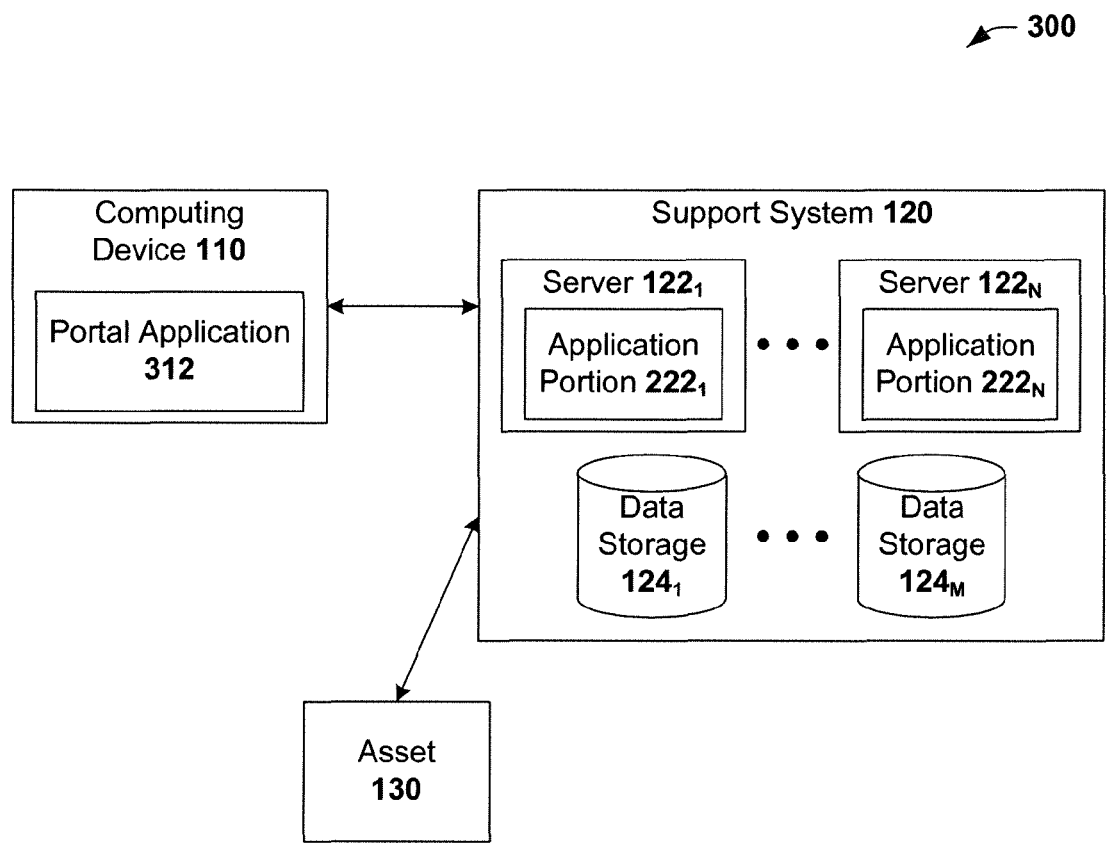
FIG. 3 is a block diagram of an exemplary, non-limiting embodiment for a diagnostic software service according to one or more aspects.

FIG. 3 depicts yet another exemplary, non-limiting embodiment of a diagnostic software service as implemented by system 300. System 300 implements the diagnostic software service as a software-as-a-service offering, in which support system 120 performs a majority of the functions described herein. In this example, support system 120 can execute a cloud-based version of the diagnostic application. Specifically, support system 120 includes one or more servers 122 respectively executed application portions 322. The diagnostic application, resident on a cloud-based platform, is accessible via client devices such as computing device 110 via a portal application 312. The portal application 312, in an aspect, can provide a web-based interface to the diagnostic application executing on servers 122. The web-based interface can be accessed via web browsing software on computing device 110.

Figure 4:
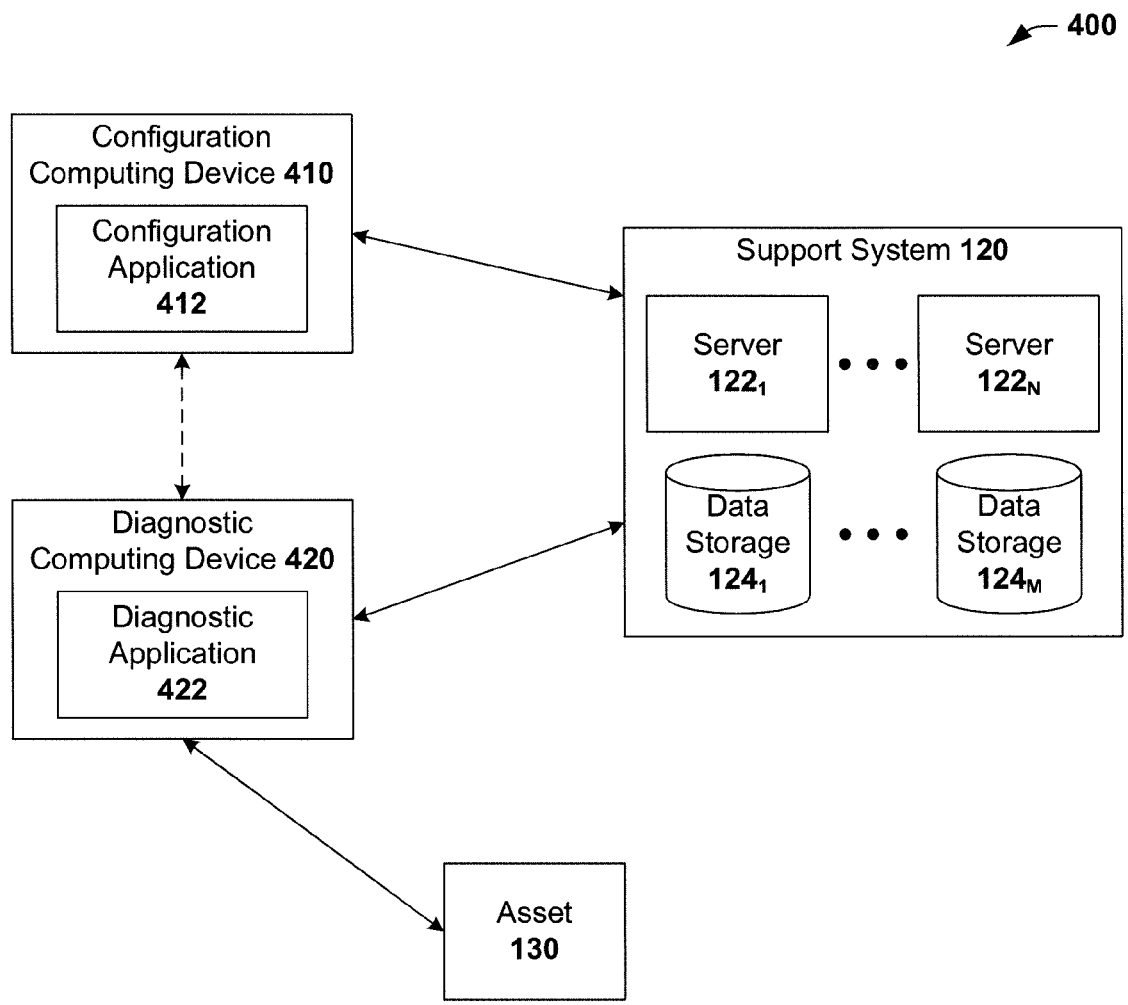
FIG. 4 is a block diagram of an exemplary, non-limiting embodiment for a diagnostic software service according to one or more aspects.

Referring to FIG. 4, an exemplary, non-limiting system 400 implementing yet another aspect of the diagnostic software service is illustrated. As shown in FIG. 1, system 400 is substantially similar to system 100 described above in that a diagnostic computing device 420, having a diagnostic application 422 installed thereon, enables access by technicians to the diagnostic software service to customize a diagnostic software package. The customized diagnostic software package can be utilized via the diagnostic computing device 422 (specifically, via the diagnostic application 422), by a technician, to analyze data collected from asset 130 and any other assets targeted by the technician. While the example depicted in FIG. 4 relates to the diagnostic software service implementation that is largely localized to a computing device in possession of or readily accessible to the technician, aspects of system 400 can be included in the distributed implementation of FIG. 2, or the cloud-based implementation of system 300.

With system 400, the diagnostic software service includes a separate configuration or customization channel available to the technician to tailor a diagnostic software package. The separate configuration channel may be in lieu of or in addition to the customization features described herein. As shown in FIG. 4, system 400 includes a configuration computing device 410 having a configuration application 412 installed thereon. That is, the configuration application 412 is stored on a computer-readable storage medium of the configuration computing device 410. The configuration application 412 includes computer-executable instructions that can be executed by a computer processor of the configuration application 412.

The configuration application 412 can receive a selection of a desired diagnostic software module from a catalog of diagnostic software modules available via the diagnostic software service. The selection can be communicated to a first server of support system 120, which is configured to manage customized diagnostic software packages of technicians accessible via diagnostic application 422 of diagnostic computing device 420. The first server can record the selection and, in some examples, forward the selection to a second server responsible for provisioning diagnostic software modules. The second server, for instance, can download the selected diagnostic software module to the diagnostic application 422 or transmit an authorization signal instructing the diagnostic application 422 to enable access to the selected diagnostic software module pre-installed with the diagnostic application 422. The first and second servers need not be separate servers and both functions above can be performed by a single server.

In an aspect, an identifier associated with the diagnostic computing device 420 can communicated along with the selection. The identifier can be utilized to connect to the diagnostic computing device 420 in order to provision the selected diagnostic software module. According to another example, the diagnostic application 422 can be configured to check-in with support system 120. Upon check-in, the selected diagnostic software module can be provisioned. In another example, the selection can be communicated directly to the diagnostic application 422, which can be configured to manage availability and accessibility of diagnostic software modules independently of support system 120.

The configuration application 412 can further receive a commitment of payment for the selected diagnostic software module. The commitment of payment can be communicated to a third server of support system 120. The third server may be the same server as either the first server receiving the selection or the second server provisioning the selected software. Upon verification of the commitment of payment, the third server can signal the first server to authorize the selection and/or the second server to provision the selected software. In this example, verification refers to successfully processing payment according to the terms of access and payment terms included in the commitment of payment. The third server can also operate separately and independently of other components of support system 120. For instance, the third server can be a payment processor server capable of servicing clients outside of the diagnostic software service. According to another example, the configuration application 412 can verify the commitment for payment. Subsequent to verification, the configuration application 412 can signal the first server and/or the second server to enable access, via the diagnostic computing device 420, to the selected diagnostic software module associated with the commitment of payment.

According to an example, the configuration computing device 410 may be associated with a representative of a service provider offering the diagnostic software service to technicians. Technicians may communicate directly with the representative to configure and customize diagnostic software packages and provide information supporting the commitment for payment.

Systems 100, 200, 300, and 400 are not intended to be mutually exclusive. Respective aspects described relative to one example above may be intermixed with other aspects for other examples.

Figure 5:
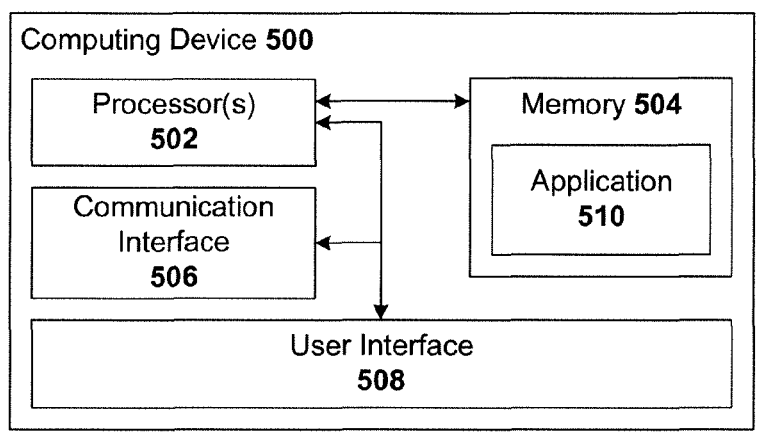
FIG. 5 is a block diagram of an exemplary, non-limiting computing device according to one or more aspects.

Turning to FIG. 5, a block diagram of an exemplary, non-limiting embodiment of computing device 500 is illustrated. Computing device 500 may serve as an exemplary device for implementing computing device 110, 410, or 420 described above. Computing device 500 includes one or more processor(s) configured to execute computer-executable instructions such as instructions composing application 510. Application 510, for example, can be diagnostic application 112, application portion 212, portal application 312, configuration application 412, or diagnostic application 422 described above. Such computer-executable instructions can be stored on one or more computer-readable media including a non-transitory, computer-readable storage medium such as memory 504 of computing device 500.

Computing device 500 includes a communication interface 506, which can be utilized to communicatively couple the computing device 500 to other computing devices, to assets, and/or to servers (remote systems). As schematically depicted and described herein, a "communication interface" refers to a logical interface through which communication between at least two entities is established and conducted. The communication interface incorporates an address or identifier to which transmission can be directed for reception by the entity utilizing the interface. The address or identifier also serves to identify an origin for transmission from the interface. As a logical interface, the communication interface 506 can include one or more protocols enabling the communication. These protocols can be layered (e.g., according to the OSI model). Further, these protocols can vary depending upon the medium of transmission. For example, the communication interface 506 can utilize a wired or wireless medium. To this end, as utilized herein, the communication interface 506 also includes physical interfaces and transmit/receive processing chains to implement the communication via the medium. For example, the communication interface 506 can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

Computing device 500 can further include a user interface 508 that comprises various elements to obtain user input and to convey user output such as displays and input devices (e.g., keyboards, pointing devices, etc.). As utilized herein, user interface 508 includes graphical user interfaces displayed by output devices (e.g., displays) and interacted with by users via input devices. Graphical user interfaces can be generated by application 510.

Figure 6:
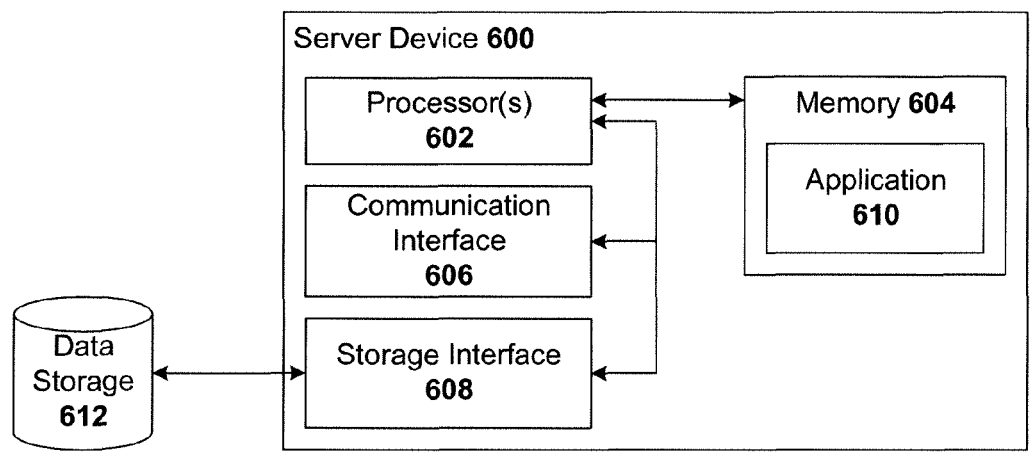
FIG. 6 is a block diagram of an exemplary, non-limiting server in accordance with one or more aspects.

FIG. 6 illustrates a block diagram of an exemplary, non-limiting embodiment of server device 600. Server device 600 can be a server of support system 120 described above. As shown, server device 600 includes one or more processors 602, a memory 604 storing application 610, a communication interface 606 and a storage interface 608. The communication interface 606 can be utilized to communicate with one or more client devices such as computing device 500 via one or more APIs exposed by application 610. Storage interface 608 operatively couples server device 600 to data storage 612. Storage interface 608 can take the form of a physical hardware interface when data storage 612 is a storage device integrated with server 600. However, data storage 612 can also take the form of be a storage server, network storage, or remote storage having a similar structure as server device 600. In this example, storage interface 608 can be a communication interface.

Server device 600 is one example of a computing device that can implement aspects of the diagnostic software service. In general, as utilized herein, a "server" refers to a type of computing device having one or more computer processors coupled to a memory (e.g., a non-transitory, computer-readable storage medium) storing computer-executable instructions for providing a service or remote functionality to one or more client devices such as computing device 500 or asset 700. The server can be a virtual machine including virtualized hardware elements executing on one or more physical computing devices like server device 600. According to another embodiment, the server can be a package of computer-executable instructions and computer-readable data, which is executed on a virtual platform. The virtual platform can include an bundle of computing resources provided by one or more physical computing devices and can provide an execution environment for the application 610. In other words, the server can be provided as a cloud-based service and, further, can be provided on top of additional cloud computing services (e.g., platform-as-a-service, infrastructure-as-a-service, etc.).

Figure 7:
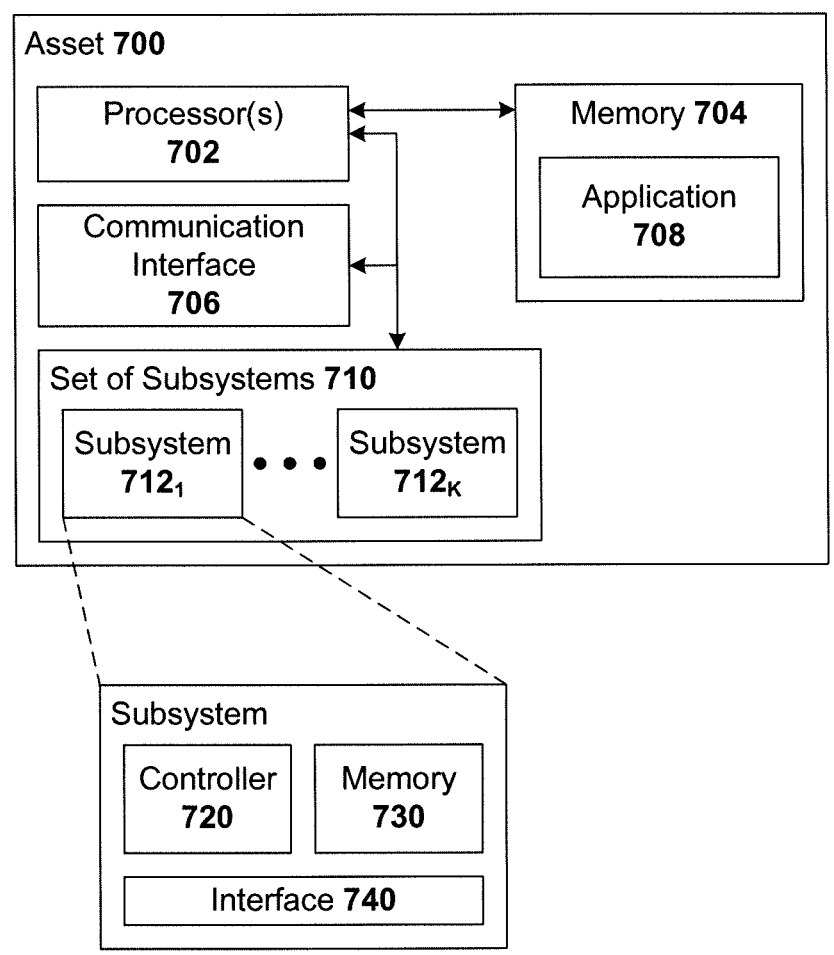
FIG. 7 is a block diagram of an exemplary, non-limiting asset according to one or more aspects.

In FIG. 7, an exemplary, non-limiting embodiment of asset 700 is depicted. Asset 700, like asset 130, may take the form of a computer-controlled device, machine, or apparatus having one or more processors 702 (also referred to as controllers or control units), a memory 704 storing an application 708, a communication interface 706, and a set of subsystems 710 including one or more subsystems $712_K$ where K is an integer greater than or equal to one. Each subsystem 712 includes a controller 720, a memory 730, and an interface 740.

Communication interface 706 can be similar to communication interfaces 506 or 606 described above. In another example, communication interface can include a physical interface, such as a communications port, through which asset data can be communicated.

Asset 700 can record asset data such as operational data and parameters, configuration settings, performance data, and the like. The asset data can be communicated to a server or computing device for analysis. In one example, the processor 702 can collect data from the set of subsystems 710 and deliver an aggregate data package via communications interface 706. In another example, controller 720 of subsystem 712 can communicate data associated with the subsystem alone via interface 740. That is, asset 700 can communicate one stream of data including data from the set of subsystems 710 or can communication multiple stream of data respectively associated with individual subsystems 712.

Figure 8:
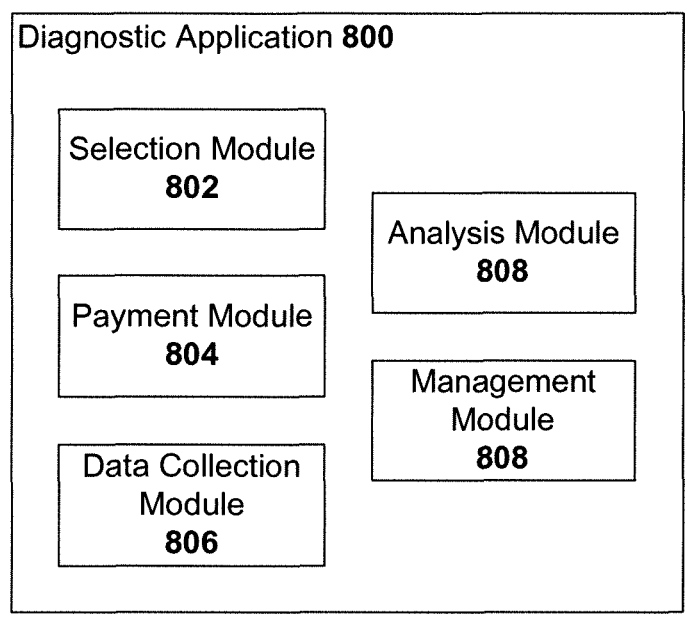
FIG. 8 is a block diagram of an exemplary, non-limiting diagnostic application according to one or more aspects.

Turning now to FIG. 8, illustrated is a schematic block diagram of an exemplary, non-limiting diagnostic application 800 implementing a diagnostic software service as described herein. As shown in FIG. 8, diagnostic application 800 includes a set of modules. As utilized herein, the term "module" refers to a portion of hardware, a portion of firmware, or a portion of software embodied as computer-executable instructions stored on a computer-readable medium, and/or combinations thereof to perform a function (s), render an action(s), and/or to cause a function or action from another module, method, or system to occur.

A selection module 802 is included that is configure to output a catalog of diagnostic software available within the diagnostic software service to analyze asset data to generate analysis results employable in maintenance, modification, or troubleshooting of an asset. The selection module 802 is further configured to receive a selection of desired diagnostic software from the catalog. The selection can be made by a user via a user interface, for example. The selection module 802 is also configured, in some examples, to communicate the selection of the desired diagnostic software to a remote system, such as support system 120 or a server 122 thereof.

The diagnostic application 800 also includes a payment module 804 configured to receive a commitment of payment for access to the desired diagnostic software selected. The payment module 804 can communicate the commitment of payment to a remote system for further processing. Alternatively, the payment module 804 can execute a transaction through a payment processing platform based on the commitment of payment.

A data collection module 806 of the diagnostic application 800 is configured to package data associated with an asset, transmit the data to a storage device or analysis device, and/or receive, or otherwise obtain or direct the data, for analysis by diagnostic software. For example, data collection module 806, like other modules of diagnostic application 800, can be distributed among several computing devices such as asset 700, server device 600, and computing device 500. Accordingly, data collection module 806, on different devices, performs different actions.

Analysis module 808 is configured to operate the desired diagnostic software to analyze asset data to generate analysis results and output analysis results. Specific functions of analysis module 808 can vary depending on location where the analysis module 808 is executed. For example, an analysis module 808 on a computing device such as computing device 110 can execute desired diagnostic software resident on the computing device or request analysis of the asset data by desired diagnostic software stored by support system 120. The generated results can then be output to a display device for consumption by a technician.

Management module 810 controls access to analysis module 808 in accordance with terms of access specified in the commitment of payment. Further, the management module 810 can direct payment module 804 to execute transactions as scheduled according to the commitment of payment. In another example, management module 810 operates responsive to signals (e.g., authorization or deauthorization signals) to manage access to analysis module 808.

The foregoing examples describe various embodiment of a general framework for a diagnostic software service providing customizable software packages to technicians for use with analysis asset data acquired from assets being maintained, repaired, upgraded, or modified. What follows is a specific example of one possible diagnostic software service utilizing the concepts described herein.

Subscription-Based Diagnostic Software Service for a Mobile Device

As mentioned above, in various embodiments, a subscription-based diagnostic software service enables distribution and utilization of software for diagnostic tools at a low cost. Technicians may acquire service agreements for customized sets of software features covering functionality respectively desired by each technician as opposed to a complete set of functionality bundled with the diagnostic tools. The service agreements can include subscriptions for software, pay-per-use agreements for software, or the like. Thus, providing diagnostic software as a service enables software licensed for use by the technicians on diagnostic tools to change when the needs of the technicians change.

In various, non-limiting embodiments, a system and associated methods are provided for a diagnostic software service that utilizes a subscription model to distribute diagnostic software to diagnostic tools. A diagnostic application is installed on a mobile device (e.g., a portable computer, a tablet computing device, a smartphone, a personal digital assistant, or substantially any portable, mobile computing device). The mobile device, and specifically the diagnostic application, communicates with an adapter which can be coupled to a vehicle. The mobile device and adapter can communicate via substantially any wired or wireless medium to transfer error codes, real-time data, or programmable vehicles settings between the diagnostic application and the vehicle.

According to one or more aspects, the diagnostic application includes integrated modules and extension modules. The integrated modules provide features and functionality that is pre-installed or pre-bundled with the diagnostic application. The extension modules include software modules providing features and functionality that may be subscribed to by a technician and, once subscribed, can be utilized via the diagnostic application. The extension modules, according to one example, can be installed or downloaded to the diagnostic application upon subscription. That is, the extension modules are not pre-installed or pre-bundled with the diagnostic application. However, it is to be appreciated that the extension modules can be bundled with the diagnostic application but remain unavailable or locked until coupled with an active subscription.

Extension modules provided according to a subscription model enable a technician to add and utilize specific diagnostic functionality in an a la carte manner. Accordingly, the technician is able to lower the cost of diagnostic software to only what is necessary for desired functionality while also reducing costs associated with changing needs (i.e., repairs on newer or different vehicles than before). For instance, the subscriptions associated with extension modules can be changed annually, monthly, or substantially any other time frame, to remove features no longer needed and/or to add features newly required. Thus, the diagnostic application changes with the needs of technicians without the upfront high cost of software licenses.

Figure 9:
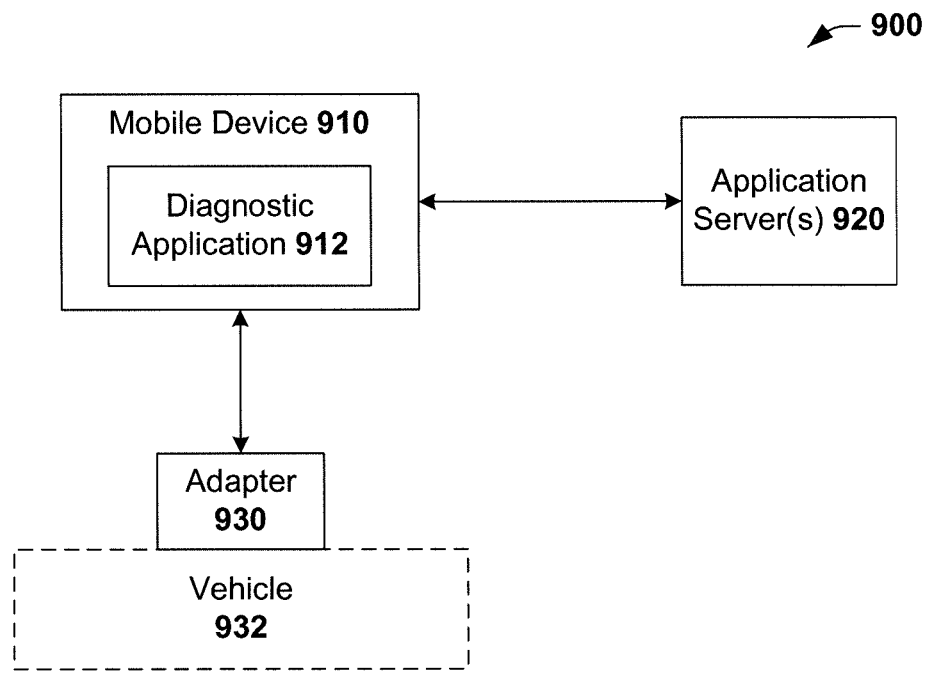
FIG. 9 is a block diagram of an exemplary, non-limiting embodiment for a subscription-based diagnostic software service according to one or more aspects.

FIG. 9 shows a block diagram illustrating an exemplary, non-limiting embodiment for a subscription-based diagnostic software service. Specifically, FIG. 9 illustrates a system 900, which can implement the subscription-based diagnostic software service. System 900 can include a mobile device 910 having a diagnostic application 912 thereon. The mobile device 910 communicates with application server(s) 920 configured to support the diagnostic application 912. For instance, the application server(s) 920 can manage service agreements (e.g., subscriptions, etc.) for software on a plurality of mobile devices similar to mobile device 910, download software modules to the mobile device 910, push support data for diagnostic application 912 to the mobile device 910, push software updates to diagnostic application 912 or installed software modules to mobile device 910, and perform backend accounting and billing associated with software subscriptions, fulfillment, and updates.

The diagnostic application 912 also communicates with an adapter 930 (or vehicle communication interface) configured to interface with a vehicle 932. According to an example, the adapter 930 interfaces with a data link connector, such as an OBD-II connector, of vehicle 932 to access the control modules or units of vehicle 932. The adapter 930 can transmit data associated with the control modules of vehicle 932 to the diagnostic application 912. Such data may include error codes, fault messages, real-time data, parameters values, and the like. In addition, the adapter 930 can forward commands or values for programmable settings from the diagnostic application 912 to the control modules of the vehicle 932.

In an aspect, the adapter 930 and the mobile device 910 can communicate via a wired or wireless medium. For instance, the mobile device 910 and adapter 930 can be coupled via a cable, e.g., USB cable, serial cable, Ethernet cable, or the like. In another example, the adapter 930 and the mobile device 910 can communicate wirelessly via WiFi (e.g., IEEE 802.11), cellular radio (e.g., GSM, LTE, CDMA, HSPA, UMTS, WiMAX, etc.), near-field communication, infrared, a short-range radio frequency (RF) protocol such as Bluetooth, or substantially any other wireless communication technology.

The mobile device 910 and application servers 920 can communicate via the Internet, a local area network (LAN), a wide area network (WAN), or a combination thereof over one or more wired or wireless links. For example, the mobile device 910 can connect wirelessly, via WiFi or the like, to a first LAN or WAN. The first LAN or WAN, in turn, is connected via a cellular communication link or a wired link to the Internet. Also, connected to the Internet is a second LAN or WAN to which the application servers 920 are connected wired or wirelessly. It is to be appreciated that the above connection scheme is an example of one possible setup and that other network topologies are employable with the aspects described herein and the claimed subject matter. For instance, system 900 may be implemented as a cloud-based or Internet-based system. Accordingly, the a subscription-based diagnostic software service provided by system 900 may be a cloud service and, as such, a nebulous networking and/or computing structure, generally opaque to mobile device 900, implements application servers 920 and enables access to the application servers 920 by mobile device 910 via one or more exposure points (e.g., IP addresses, web addresses, network addresses, domain names, uniform resource indicators (URIs), application program interfaces (APIs), etc.). In this manner, the application servers 920 can execute on one or more physical computing devices (i.e., hardware) located remotely from mobile device 910 such as in a data center or other installation. In addition, the application servers 920 can also execute on one or more virtual machines, which in turn, execute on one or more physical computing devices. In this way, the diagnostic software service provided by the application servers 920 can be modified (e.g., relocated to different physical hardware, scaled up (i.e., given greater resources), scaled down (i.e., given less resources), etc.) without disruption to mobile device 910.

Figure 10:
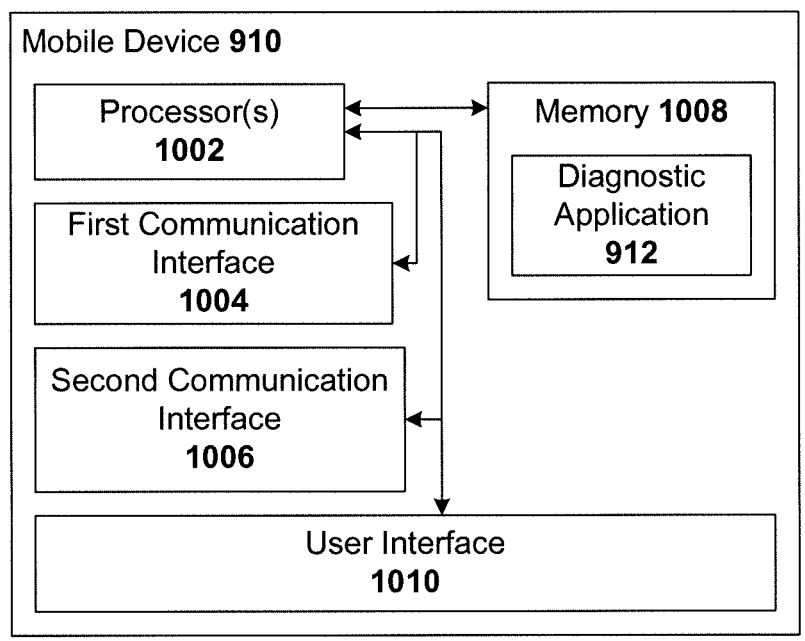
FIG. 10 is a block diagram of an exemplary, non-limiting mobile device according to one or more aspects.

Turning to FIG. 10, a block diagram of an exemplary, non-limiting embodiment of mobile device 910 is illustrated. Mobile device 910 includes one or more processor(s) 1002 configured to execute computer-executable instructions such as instructions composing diagnostic application 912. Such computer-executable instructions can be stored on one or more computer-readable media including a non-transitory, computer-readable storage medium such as memory 1008 of mobile device 910.

Mobile device 910 includes a first communication interface 1004 and a second communication interface 1006. As shown in FIG. 10, first communication interface 1004 can couple mobile device 910 to the adapter 930. As described above, first communication interface 1004 can be a wired or wireless interface including, but not limited, a USB interface, a serial interface, a WiFi interface, a short-range RF interface (Bluetooth), an infrared interface, a near-field communication (NFC) interface, etc. Second communication interface 1006 can couple mobile device 910 to the application servers 920. As such, second communication interface 1006 can be a WiFi interface, an Ethernet interface, a fiber optic interface, a cellular radio interface, a satellite interface, etc. While shown separate in FIG. 10, first communication interface 1004 and second communication interface 1006 can be a single interface or an interface capable of simultaneous communication over multiple connections.

Mobile device 910 can further include a user interface 1010 that comprises various elements to obtain user input and to convey user output. For instance, user interface 1010 may comprise a touch display which operates as both an input device and an output device. In addition, user interface 1010 may also include various buttons, switches, keys, etc. by which a user can input information to mobile device 910, and other displays, LED indicators, etc. by which other information can be output to the user.

In accordance with an embodiment, mobile device 910 is a computing device, which is readily carried by a technician such a smartphone or tablet device. However, it is to be appreciated that mobile device 910 may be other portable form-factors such as a laptop computer, a convertible laptop, a cell phone, a PDA, a pocket computing device, a watch computing device, or the like. Moreover, while referred to as "mobile" it is to be appreciated that the functionality described herein with respect to mobile device 910 can be performed by a desktop computer, or other larger, less portable computing device. That is, diagnostic application 912 can be installed and executed on substantially any computing device provided that such a computing device can communicated with adapter 930 and application servers 920 as described above with regard to FIG. 9.

Still further, the mobile device 910 may be a personal device of the technician. That is, mobile device 910 may be a version of a mobile computing device marketed and sold to consumers. Alternatively, it is to be appreciated that mobile device 910 may be a specialty device such as, for example, a customized device having a hardened housing to withstand a shop environment.

Figure 11:
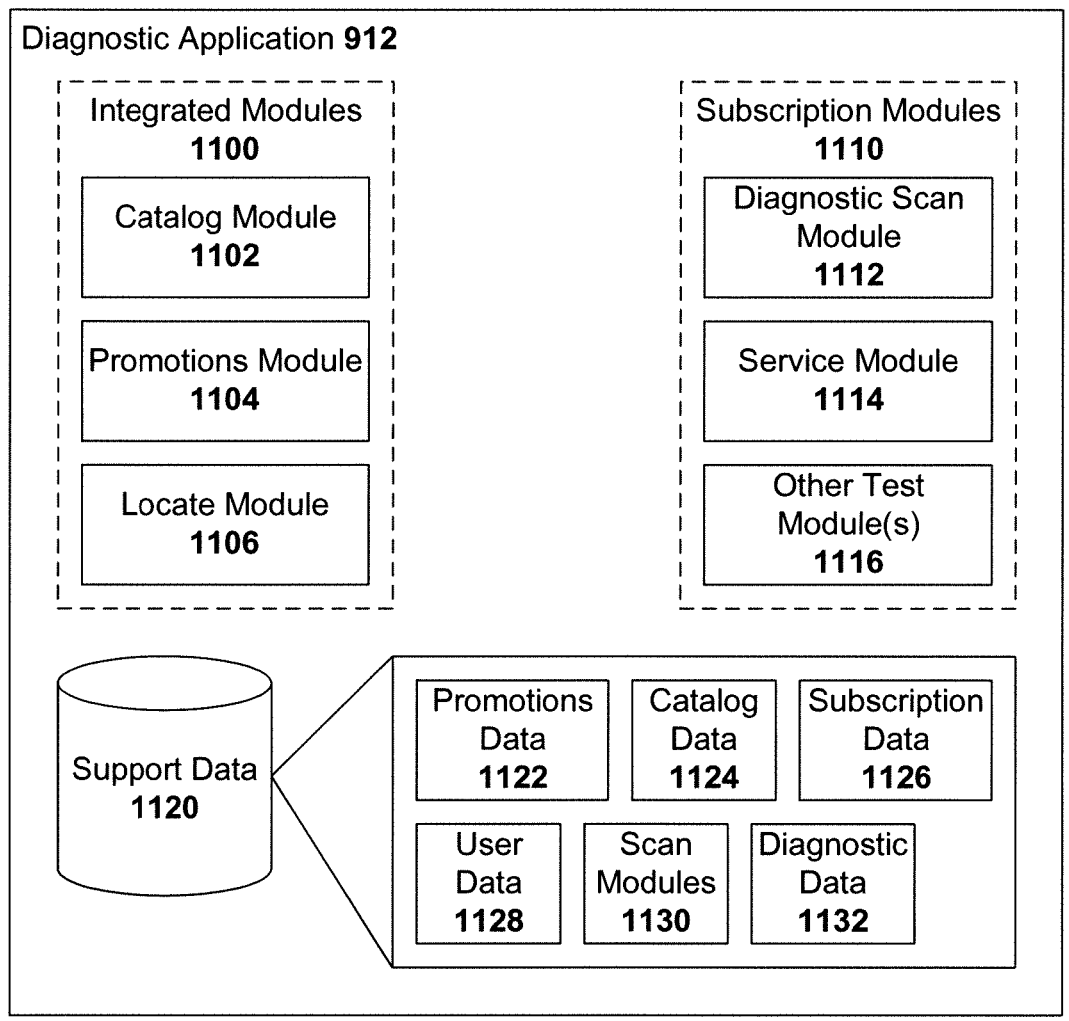
FIG. 11 is a block diagram of an exemplary, non-limiting diagnostic application according to one or more aspects.

FIG. 11 illustrates a block diagram of an exemplary, non-limiting embodiment of diagnostic application 912 according to one or more aspects. Diagnostic application 912 comprises computer-executable instructions and computer-readable data stored on memory 1008 of mobile device 910. The computer-executable instructions of diagnostic application 912 are executable by processor 1002 of mobile device 910.

As shown in FIG. 11, diagnostic application 912 may include a set of integrated modules 1100, a set of extension modules 1110, and support data 1120. The set of integrated modules 1100 and the set of extension modules 1110 include computer-executable instructions implementing various features, processes, operations, etc. of diagnostic application 912. The set of integrated modules 1110 include portions of computer-executable code, which are built-in (i.e., pre-bundled) with the computer-executable code of the diagnostic application 912. The set of extension modules 1110 include portions of computer-executable code, which are not pre-bundled or built-in with the computer-executable instructions of the diagnostic application 912. Rather, the set of extension modules 1110 include add-on processes, functions, applications, etc., which a user of diagnostic application 912 (i.e., a technician) acquires in order to utilize the functionality implemented thereby. According to one example, a service agreement can be generated between a technician (i.e., user of diagnostic application 912) and an application/service provider (e.g., provider of diagnostic application 912, provider of the diagnostic software service, and/or operator of application server 920). The service agreement can specify software modules to be provided to diagnostic application 912 as extension module 1110 as well as conditions of use for those software modules. In accordance with the service agreement, the set of extension modules 1110 can be downloaded by diagnostic application 912 from application server 920 to enable access and utilization by the technician.

It is to be appreciated that computer-executable code of the set of extension modules 1110 can be built-in with diagnostic application 912. In such cases, the extension modules 1110 are deactivated or otherwise unavailable for execution until subject to a service agreement. In yet another example, the set of extension modules 1110 can be stored externally of diagnostic application 912 (i.e., remote from mobile device 910) and accessed via a application program interface (API) provided in accordance with the service agreement. Further to this example, diagnostic application 912 can transfer data received from vehicle 932 via adapter 930 to a remote system (e.g. application server 920) having the set of extension modules 1110 in the form of an API request to a module. However, it is to be appreciated that other mechanisms to access remotely located modules may be utilized and the claimed subject matter is not limited to API-level access. When the technician is authorized (i.e., has a service agreement covering the functionality requested), the remote system responds with results of execution of the requested module.

The set of integrated modules 1100 includes a catalog module 1102, a promotions module 1104, a location module 1106, and a management module 1108. According to an aspect, the catalog module 102 provides a product catalog through which a user can browse available products for sale and place an order for products. The products may be diagnostic tools, hand tools, power tools, accessories, tool boxes and cases, and/or substantially any products useful in a vehicle repair shop or by a technician. Accordingly, while performing diagnostics and tests on vehicle 932 with diagnostic application 912, a technician can identify a tool needed for a task, launch the catalog module 1102 to browse the catalog, and utilize the catalog module 1102 to find and purchase the tool.

The promotions module 1104 outputs promotional information and advertisements to users of the diagnostic application 912. For example, on a home screen of diagnostic application 912, a banner promotion can be displayed by the promotions module 1104. The banner promotion can be periodically cycled with updated promotions based on information received from application server 920 and retained as part of support data 1120. Moreover, the promotions module 1104 can retrieve and display a current promotional flyer that provides information on current promotions, deals, announcements, etc. The promotional information may relate to an application provider of diagnostic application 912 and/or mobile device 910, a service provider managing application server 920 and distributing diagnostic application 912, trusted third parties, etc. However, it is to be appreciated that the application provider and the service provider can be identical entities as is common with software-as-a-service models.

Location module 1106 is configured to utilize an address input by the technician or a specific location generated through self-locating mechanisms of mobile device 910 to provide location-based functionality and support to the technician. A location, whether a mailing address, triangulated position, global position, or the like, is maintained by location module 1106. It is to be appreciated that multiple locations or types of location can be maintained. For instance, one location maintained can be a technician location specific to a technician, such as a mail address. Another location maintained can be a dynamic location related to the mobile device 910 or diagnostic application 912. Accordingly, location-based services can be provided according to these different types of location. For example, some services can be provided based on a general or regional location of a technician currently utilizing diagnostic application 912. These service can often be technician-specific and depend on the technician utilizing diagnostic application 912. According to another example, other services can be provided based on a specific or device level location related to mobile device 910, which can be technician-agnostic and employable in situations where two or more technicians share use of mobile device 910 and/or diagnostic application 912.

According to an aspect, location module 1106 enables a technician to find a distributor of products sold by the application/service provider. That is, the diagnostic application 912, utilizing the location(s) maintained by the location module 1106, can identify an authorized distributor or reseller of the products included in the products catalog accessible with the catalogs module 1102. In further aspects, the location(s) maintained by the location can be utilized by other modules, such as the catalog module 1102 or promotions module 304 to provide customized and/or personalized promotions, customized catalog organization, product recommendations, distributor information, etc., which are based on location.

Management module 1108 provides administration functions, configuration of diagnostic application 1112, or the like. For example, management module 1108 enables administration (e.g., retrieval, display, and editing) of user profiles, application profiles and/or service agreements. In addition, management module 1108 enables registration of technicians with application server 920 and configuration of payment information. Moreover, management module 1108 can perform server agreement management on the mobile device 910. For instance, the management module 1108 can disable access to the set of extension modules 1110 when a service agreement expires. Further, the management module 1108 may be configured to require the diagnostic application 912 to periodically check-in with the application server 1120 to verify the service agreement is valid and that no unauthorized use of the set of extension modules 1110 occurs.

The set of extension modules 1110, as described above, include modules which are downloaded to diagnostic application 912 in accordance with a service agreement. Such modules may be configured to include one or more diagnostic scan modules 1112 configured to retrieve and analyze diagnostic trouble codes and real-time data from vehicles, such as data vehicle 932 received via adapter 930; a service module 1114 configured to retrieve service manuals for vehicles or specific fix information for a problem identified by the diagnostic scan modules 1112, and to calculate service estimates based the problem identified; and other diagnostic modules 1116 such as battery testers, pressure testers, anti-lock brake system diagnostics, airbag diagnostics, drivetrain diagnostics, or the like. As described previously, vehicle manufacturers typically implement unique trouble codes and/or parameters IDs associated with real-time data. Accordingly, diagnostic scan modules 1112 may be configured to comprise a set of diagnostic scan modules for specific makes, models, regions, and/or model years.

According to an aspect, each of the above modules can be subject to separate service agreements or aggregated into one or more groups, respectively associated with one or more service agreements, depending on the type of service desired and the modules desired. One type of service provided may be a pay-per-use service where the technician pays for each use of an extension module 1110. What defines a "use" can vary from extension module to extension module and may be codified in the corresponding service agreement. For example, for service module 1114, a "use" may be granular and include one search for a specific fix, one retrieval of a service manual, one estimate calculation, or the like. For diagnostic scan modules 1112 and/or other diagnostic modules 1116, a "use" may be similarly granular and include one scan of a vehicle or one diagnostic test, respectively. In another example, a "use" may include unlimited utilization of a software module for a time period. For instance, any action performed via the software module can trigger a "use" which is paid for according to the service agreement; however, continued actions via the software module, for a given time period, will not trigger additional "uses". Such a time period can span an hour, several hours, a day, etc.

Another type of service can be a subscription service, which involves a subscription to one or more extension modules 1110 according to the service agreement (e.g., the terms of the subscription). With the subscription, the technician would have unfettered access to the extension modules 1110 subscribed to for the lifetime of the subscription. Subscriptions can have a variety of durations and payment schedules. For instance, subscriptions can be annual, monthly, weekly, etc. In addition, subscriptions can have unbounded durations and remain active provided regular payments are rendered according to the payment schedule established in the service agreement. Moreover, subscriptions can involve single payments congruent with the duration, or have installment payments. For example, a subscription to manufacturer-specific diagnostic functionality can have an annual duration with monthly payments. Subscriptions may be set for automatic renewal upon expiration of the term, or set to require explicit indication of renewal from subscribers. Moreover, subscriptions may be cancelled before the end of the term, with or without a penalty, or changed at any time. To illustrate the malleability of subscriptions, consider a specific example in which a technician subscribes to a particular make for a one year term with a fixed monthly payment. Two months after the initial subscription, the user can decide to subscribe to an additional make. The subscription can be updated to reflect a higher monthly payment for a subscription to two makes. Moreover, the term of the updated subscription can remain unchanged (i.e., the term for the second make expires after 10 months) to align terms for both makes to the same renewal date. Alternatively, the addition of the new make can effectively cancel the previous subscription, without penalty, and generate a new subscription for two makes having a one year term. From the forgoing examples, it is to be appreciated that subscriptions to specific modules, sub-modules, functionality, applications, or information accessible via diagnostic application 912 may be configured to have a wide variety of parameters and characteristics. Such characteristics can be determined by the provider of diagnostic application 912 and/or third-party vendors providing specific functionality and modules subscribable via the diagnostic application 912.

Extension modules, such as the set of extension modules 1110, can be made available for a la carte selection by diagnostic application 912. However, it is to be appreciated that, in addition to individual selection, extension modules can be available for selection as bundles or groups. For example, diagnostic scan modules 1112, as described above, can include separate modules for specific makes, models, and/or model years. Each of the these separate modules can be separately selected to be provided as a service (e.g., subscription service, pay-per-use service, etc.), or selected as groups according to various aggregation levels or schemes. For instance, scan modules be subscribed to be based on model-year (e.g., 2008 to 2012), make (e.g., Ford®), model (e.g., F-150®), geographic or regional groupings (e.g., Domestic, Asian, or European), or various combinations thereof.

In a specific example, subscriptions (or pay-per-use service agreements) are available diagnostic scan modules 1112 according to vehicle make (i.e., manufacturer). That is, a technician can purchase subscriptions to diagnostic functionality associated with specific vehicle makes or manufacturers for use via diagnostic application 1112. Such subscriptions can include diagnostic functionality for every model released by the specific vehicle makes or manufacturers for all model years. Moreover, subscriptions are available to geographical or regional groupings of vehicle manufacturers such as Domestic, European, Asian, etc.

Service agreements associated with groups or bundles of software modules may be provided at a discount. For instance, if a subscription to one vehicle make is $X/month, then a subscription to ten individual makes may be $Y/month and reflect a price reduction, by some predetermined percentage, from a total price of ten individual makes. Moreover, a subscription to a regional group of makes may be similarly discounted and/or offered at a special bundle price. Further still, a full subscription to all functionality available may carry a subscription fee less than the sum of individual fees.

As shown in FIG. 11, diagnostic application 912 includes various support data 1120. Support data 1120 includes promotions data 1122 for promotions module 1104; catalog data 1124 for catalog module 1102; service agreement data 1126 for diagnostic application 912 to maintain appropriate access to the set of extension modules 1110; user data 1128 indicating one or more user accounts or profiles for diagnostic application 912; application profile 1130 which details installed or accessible extension modules; diagnostic data 1132 including data generated by diagnostic scan modules 1112, other diagnostic modules 1116, and/or retrieved from vehicle 932 via adapter 930; and location data 1134 representing the locations maintained by location modules 1106 and other location-based information accessible or employable by promotions modules 1104, catalog module 1102, or other functions of diagnostic application 912. According to an embodiment, multiple technicians are enabled to utilize diagnostic application 912 by maintaining separate user accounts or profiles. Each technician is provided access to software modules according to his or her service agreement, but not software modules associated with service agreements of other technicians. Accordingly, service agreement data 1126 and user data 1128 can be stored in association with one another. Moreover, as an additional check against unauthorized use of software modules, each service agreement can be linked to an identifier associated with the mobile device 910 and/or adapter 930 such that the software modules are only authorized, and accessible, from the linked mobile device 910 and/or adapter 930. When service agreements are linked to the identifier of adapter 930, the technician can easily transfer diagnostic application 912 and extension modules to a new device in the event of loss of damage to an original device on which the service agreements were acquired. Moreover, as described later, service agreements and user profiles can also be retained by application server 920. Accordingly, multiple technicians are enabled to utilize respective software modules, corresponding to multiple service agreements, on multiple devices executing diagnostic application 912. For instance, a technician can login to the diagnostic application 912 on a new device, the device contacts the application server 920 to retrieve service agreements corresponding to the technician, and appropriate software modules can be downloaded or unlocked on the new device in accordance with the service agreements.

Figure 12:
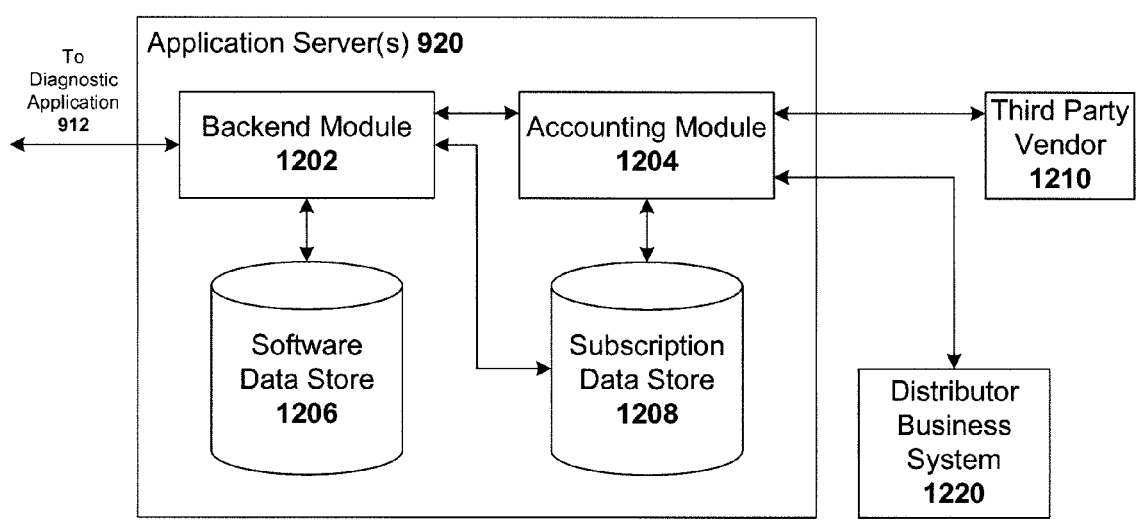
FIG. 12 is a schematic diagram of an exemplary, non-limiting application server in accordance with one or more aspects.

Turning now to FIG. 12, illustrated is an exemplary, non-limiting embodiment of an application server 920. It is to be appreciated that application server 920 may be a single server or a group of servers operating jointly to support diagnostic application 912. As understood by one of ordinary skill in the art, a server is computing device comprising one or more computer processors coupled to a memory (e.g., a non-transitory, computer-readable storage medium) storing computer-executable instructions for providing a service or remote functionality to one or more client devices such as mobile device 910 running diagnostics application 912. The server may be a virtual machine including virtualized hardware elements executing on one or more physical computing devices. According to another embodiment, the application server 920 may be a package of computer-executable instructions and computer-readable data, which is executed on a virtual platform. The virtual platform can include an bundle of computing resources provided by one or more physical computing devices and can provide an execution environment for the application server 920. In other words, application server 920 can be provided as a cloud-based service and, further, can be provided on top of additional cloud computing services (e.g., platform-as-a-service, infrastructure-as-a-service, etc.).

As shown in FIG. 12, application server 920 includes a backend module 1202 configured to communicate with diagnostic application 912 to receive information from and send information to the diagnostic application 912. Such information transmitted by diagnostic application 912 and received by backend module 1202 can include user credentials for authentication, service agreement information for verification, request to retrieve service agreement information and/or user profiles retained on profile data store 1208, requests for changes to service agreements, requests for updated support data, download requests for software modules retained by software data store 1206, payment information, and the like. Information transmitted to the diagnostic application 912 by backend module 1202 can include software modules, from software data store 1206, subject to an active service agreement, service agreement information maintained by application server 920 for verification and/or restoration by diagnostic application 912, user profile information for restoration by diagnostic application 912, updates to support data, commands to diagnostic application 912 to change service agreement statuses on mobile device 910, notifications regarding service agreement statuses, and the like.

Accounting module 1204 is configured to provide service agreement management, billing, and crediting to third parties. For instance, accounting module 1204 may be configured to automatically manage invoicing and/or charging for active service agreements maintained by profile data store 408 according to payment schedules and terms included in service agreement information. Accounting module 1204 manages service agreement status in cases of non-payment. For example, accounting module 1204 can transition a service agreement from an active status to a non-payment status having a grace period. Upon continued non-payment upon expiration of the grace period, accounting module 1204 can deactivate the service agreement and notify backend module 1202 to issue an appropriate command to the corresponding diagnostic application 912 to disable the software stored thereon.

Moreover, the accounting module 1204 can periodically transmit information regarding service agreements and/or software utilization to an auxiliary 1210 for invoicing by third-party vendors of software modules. For example, application server 920 can provide software, developed by the third-party vendor, to technicians according to various service agreements. Accounting module 1204 provides information regarding software utilization to the auxiliary system 910 to enable the third-party vendors to invoice the application/service provider (i.e., entity providing application server 920 and/or diagnostic application 912) according to a pre-arranged license agreement for the software.

Further still, accounting module 1204 may be configured to interface with a retail point of sale (POS) system 1220 to record sales(e.g., service agreement signups, subscriptions, products sales via catalog module 1102, etc.) to a distributor. According to an aspect, the service provider can generally operate according to a franchise model where the service provider does not provide products and services directly to end users (i.e., technicians). Rather, the service provider operates through distributors. Thus, while the systems described herein involve direct interaction between the service provider and the technicians via the diagnostic application 912 and application server 920, transactions made by technicians are recorded at the retail POS system 1220. According to one example, the distributor can directly sell adapter 930 or mobile device 910 to a technician. This sale is recorded in the retail point of sale system 1220 and transmitted to application server 920. Accordingly, when the technician links the mobile device 910 and/or the adapter 930 to a service agreement, the accounting module 1204 identifies the associated distributor in order to record the acquisition of the service agreement to the retail point of sale system 1220.

In view of the exemplary, non-limiting devices, servers, and systems described supra, various methodologies can be implemented in accordance with the disclosed are better appreciated with reference to flow diagrams of FIGS. 13-19. The flow diagrams are shown and described as a series of blocks. However, the claimed subject matter is not limited by the order of the blocks depicted and described herein, as some blocks can occur in different orders and/or concurrently with other blocks.

Figure 13:
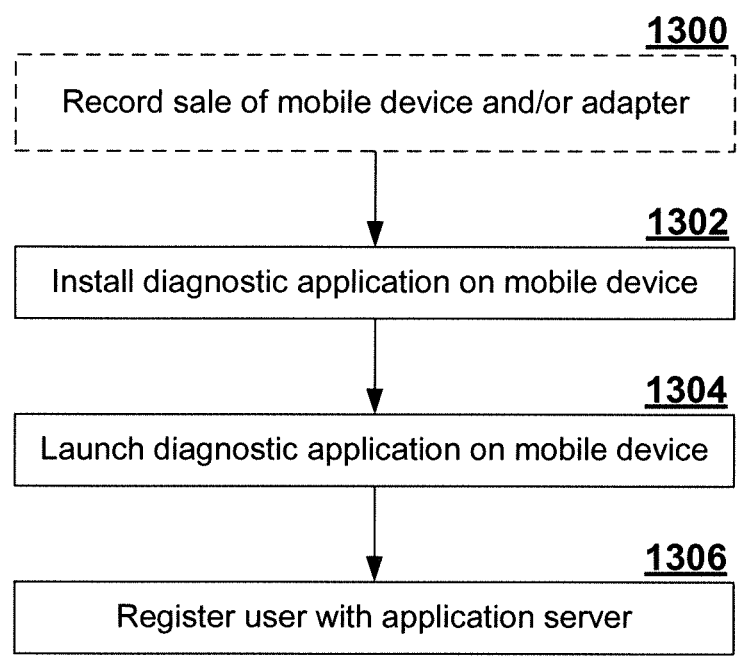
FIG. 13 is a flow diagram of an exemplary, non-limiting method for registering a user within the subscription-based diagnostic software service.

Turning now to FIG. 13, a flow diagram of an exemplary, non-limiting method for registering a technician within the subscription-based diagnostic software service is illustrated. At 1300, a sale is recorded of a mobile device capable of running a diagnostic application and/or of an adapter configured to interface the diagnostic application to a vehicle. As described above, the sale can be performed by a distributor, associated with the service/application provider, directly to a technician and recorded in a retail point of sale system which is communicatively coupled to an application server supporting the diagnostic application. At 1302, the diagnostic application is installed on the mobile device. It is to be appreciated that the diagnostic application can be pre-installed on the mobile device prior to the sale at 1300. Alternatively, the diagnostic application can be downloaded and installed from an application repository associated with an operating system of the mobile device. At 1304, the diagnostic application is launched (i.e., executed) on the mobile device. At 1306, the technician completes a registration via the diagnostic application. The diagnostic application retains user data as described above and further transmit user data to the application server to complete the registration process. Accordingly, with user data stored on the mobile device, the diagnostic application can operate without maintaining an active connection to the application server. Moreover, with user data stored on the application server, the technician in enabled to utilize the diagnostic application on another mobile device.

Figure 14:
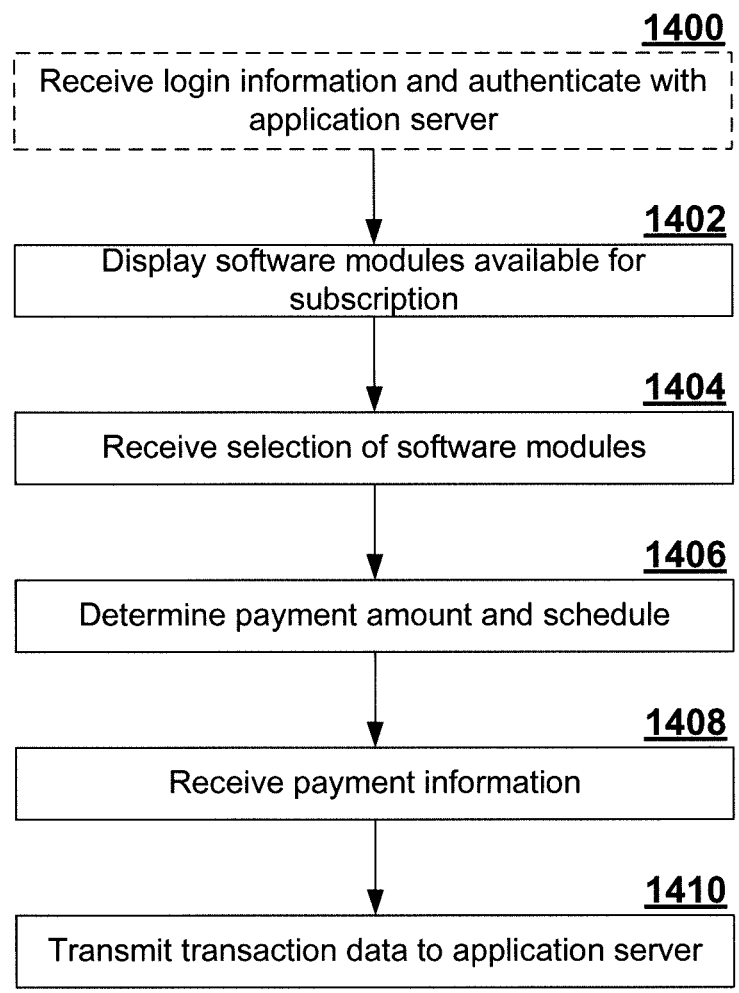
FIG. 14 is a flow diagram of an exemplary, non-limiting method for purchasing a subscription to diagnostic software.

FIG. 14 illustrates a flow diagram of an exemplary, non-limiting method for acquiring a service agreement, such as a subscription, to diagnostic software. According to an aspect, this process can be performed by the diagnostic application 912 of mobile device 910 described supra. At 1400, login information is received from a technician. The login information can be authenticated with the application server and/or with stored user data on the mobile device. Following authentication, service agreement information can be retrieved from either a memory of the mobile device and/or the application server. Moreover, following authentication, personalized content and/or promotions, based on either an identity of the technician or location data, can be retrieved from the application server for display. At 1402, based on service agreement information retrieved, software modules available for acquisition, are displayed. At 1404, a selection of software modules for addition is received. At 1406, a payment terms determined, based on the selection of software modules, and output to the technician for acceptance. Payment terms may include a payment schedule, payment amount, and payment conditions (i.e., subscription, per-use, etc.) At 1408, payment information is received from the technician. At 1410, transaction data is transmitted to the application server to complete payment and to manage the purchased service agreement.

Figure 15:
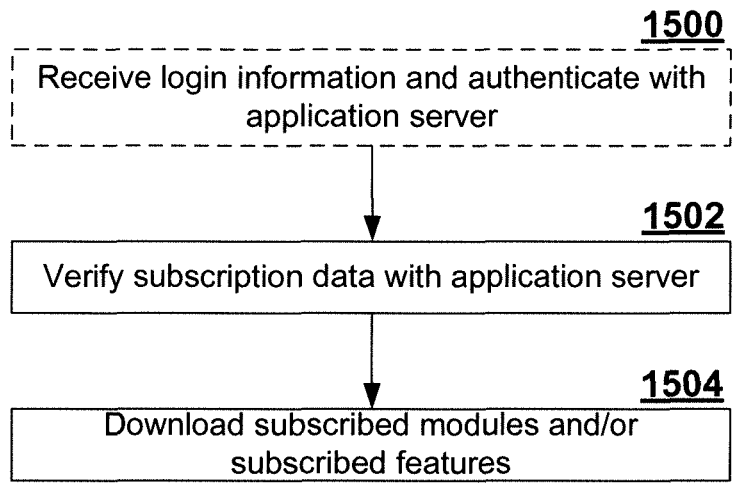
FIG. 15 is a flow diagram of an exemplary, non-limiting method for acquiring software modules in accordance with a subscription.

FIG. 15 illustrates a flow diagram of an exemplary, non-limiting method for acquiring software modules in accordance with a service agreement. At 1500, the diagnostic application receives login information from the technician and authenticates with the application server. At 1502, service agreement data is verified by the application server. At 1504, software modules, features, and/or data, subject to one or more service agreements, is downloaded by the diagnostic application if not already downloaded. According to an aspect, the application service can obtain application profile data from the diagnostic application to determine which software modules are installed or unlocked on the mobile device.

Figure 16:
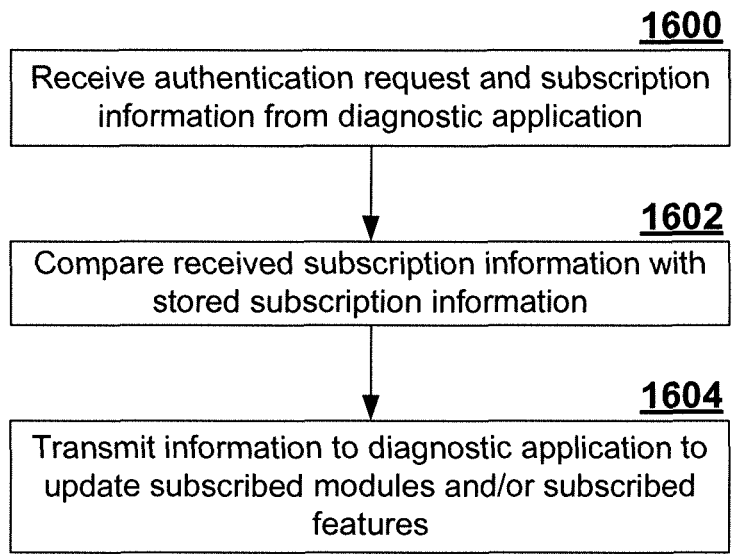
FIG. 16 is a flow diagram of an exemplary, non-limiting method for verifying a state of a diagnostic application.

Referring now to FIG. 16, a flow diagram of an exemplary, non-limiting method for verifying a state of a diagnostic application is illustrated. According to an aspect, this process may be performed by application server 920. At 1600, an authentication request, application profile data, and service agreement information are received from a diagnostic application. At 1602, the service agreement information received and application profile are compared with stored service agreement information. At 1604, information is transmitted to the diagnostic application to update extension modules, features, or data in accordance with a result of the comparison. By way of example, the comparison may indicate that the diagnostic application does not include one or more modules, features, or data for which the technician is currently authorized. Accordingly, the application server can transmit the missing one or more modules, features, or data to the diagnostic application. According to another example, the comparison may indicate that updated versions of one or more modules, features, or data are available which are not loaded on the diagnostic application. Accordingly, the updated information can be transmitted to the diagnostic application. In yet another example, the comparison may indicate that the diagnostic application has an invalid service agreement. For instance, an invalid service agreement can be identified upon a first check-in by the diagnostic application following deactivation of a service agreement due to non-payment. An invalid service agreement can also occur due to expiration of an subscription period, or an attempt to utilize extension modules with an adapter having a identifier different than the identifier linked to the service agreement. In such situations involving an invalid service agreement, the application server can transmit a command to update the extension modules, features and/or data of to the diagnostic application to a deactivated state to prevent unauthorized use. In further examples, the application server may identify personalized promotions, product information, product recommendations, software updates, or the like, and transmit such data to the diagnostic application. Personalized data and recommendations can be based on user profile data associated with the technician, location data associated with the diagnostic application or mobile device, and/or application profile data.

Figure 17:
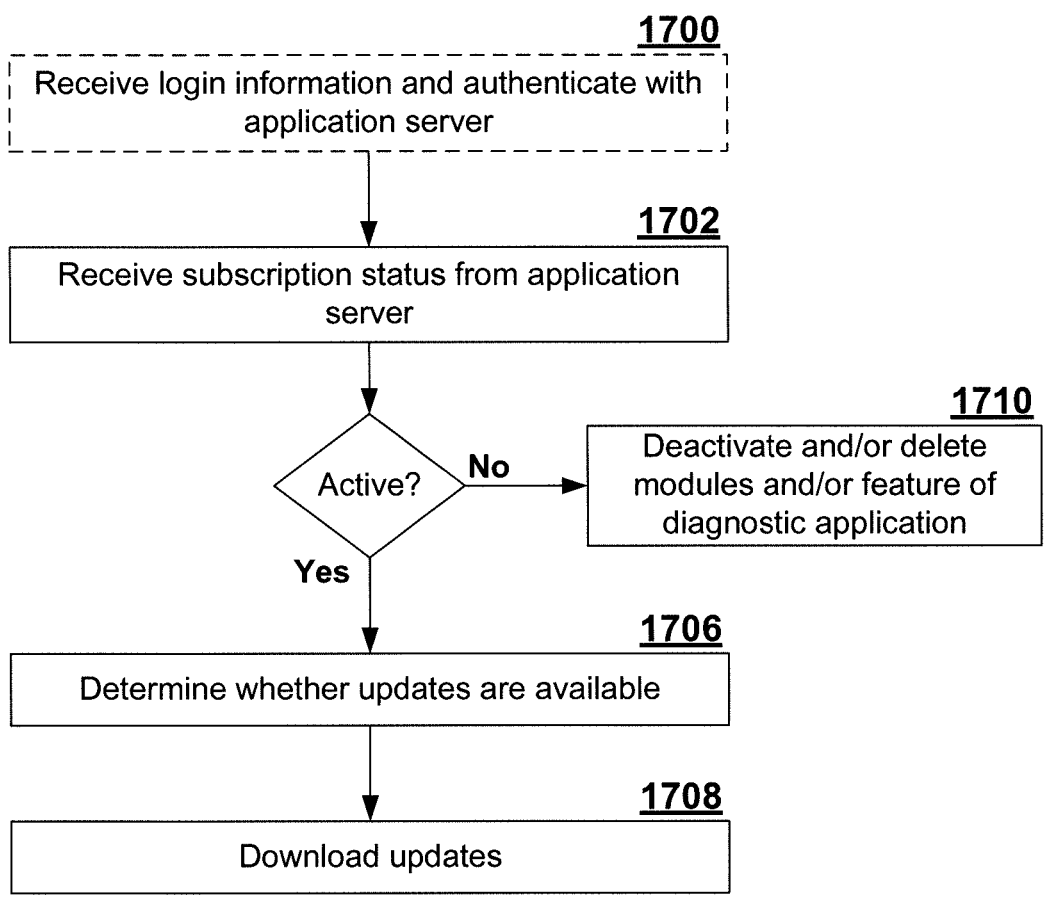
FIG. 17 is a flow diagram of an exemplary, non-limiting embodiment of a method for updating an diagnostic application according to one or more aspects.

FIG. 17 illustrates an exemplary, non-limiting embodiment of a method for updating diagnostic application and, specifically, updating extension modules, features, or data. According to an aspect, diagnostic application 912 is configured to require a check-in with application server 920 periodically (i.e., once a month, once a week, etc.) in order to verify service agreement statuses, receive updates, receive new information, and the like. According to another aspect, application server 920 can transmit push notification to diagnostic application 912 to notify technicians of pending updates, expired service agreements, promotions, new products, etc.

At 1700, the diagnostic application receives login information from the technician and authenticates with the application server. At 1702, service agreement status and version information are received from the application server. A determination is made, based on the service agreement status received, as to whether the service agreement is active. When active, it is determined, at 1706, whether updates are available based on received version information. At 1708, the updates are downloaded. When the service agreement is not active, the diagnostic application deactivates and/or deletes modules, features, and/or data subject to the inactive service agreement. It is to be appreciated that the determination above may be made by the application server. For instance, the diagnostic application can transmit application profile data to the application server, which determines whether updated software is available for download and notifies the diagnostic application of such updates. Moreover, upon authentication with the application server, the application service can issue a notification to deactivate or delete modules due to an inactive service agreement.

According to an aspect, the updates and/or notifications may include updated support data such as catalog data 1124 or promotions data 1122, in addition to software updates. As such, the catalog data 1124 or promotions data 1122 can be identified and downloaded by the diagnostic application even when the service agreement is invalid. In other words, according to an aspect, inactive service agreements only affect extension software modules, features, and/or data subject to service agreements and does not affect integrated modules, features, or data.

Figure 18:
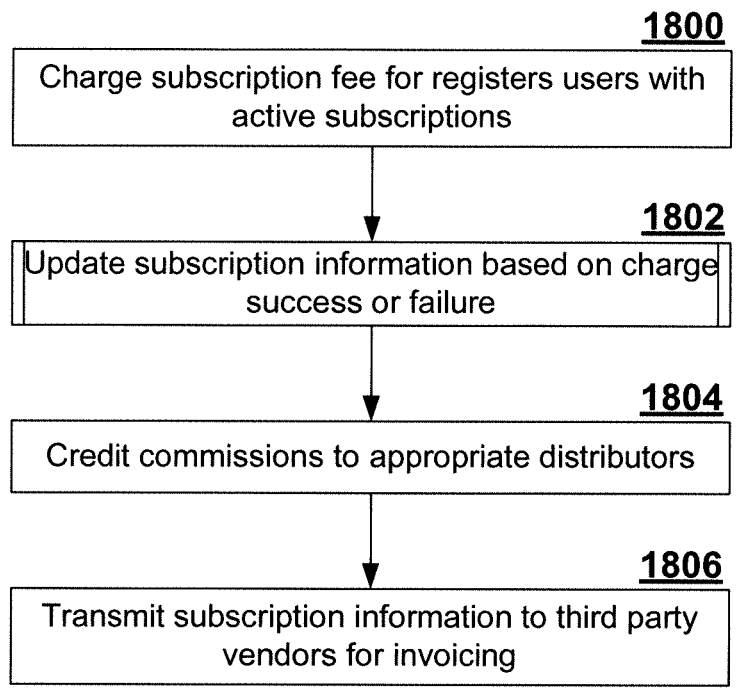
FIG. 18 is a flow diagram of an exemplary, non-limiting method of managing a subscription according to one or more aspects.

Turning now to FIG. 18, illustrated is an exemplary, non-limiting method of managing a service agreements according to one or more aspects. At 1800, service fees for registered technicians with active service agreements are automatically charged according to stored payment information. The payment information may be credit card information (or similar electronic payment format) or identification of an account of credits exchangeable for software usage. At 1802, service agreement information is updated based on a success or failure of the charge. At 1804, successful charges can be recorded to a retail point of sale system. At 1806, service agreement information and/or software utilization information is transmitted to an auxiliary for invoicing by third-party vendors.

Figure 19:
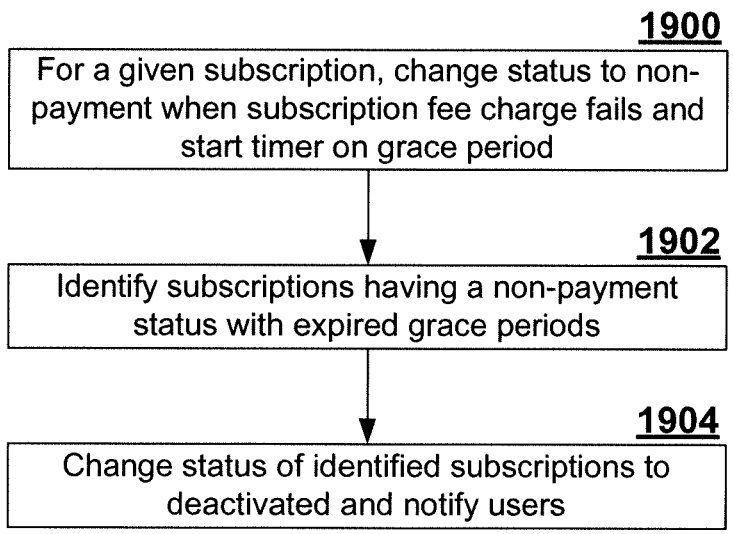
FIG. 19 is a flow diagram of an exemplary, non-limiting method of updating an subscription status.

FIG. 19 illustrates an exemplary, non-limiting method of updating a service agreement status. At 1900, for a given service agreement, a status is changed to a non-payment status when a charge of a service fee fails. A timer for a grace period is started. At 1902, service agreements having non-payment statuses with expired grace periods are identified. At 1904, statuses of the identified service agreements are changed to deactivated or invalid and the corresponding technicians are notified.

Exemplary Networked and Distributed Environments

One of ordinary skill in the art can appreciate that the various embodiments of a subscription-based diagnostic software service described herein can be implemented in connection with any computing device, client device, or server device, which can be deployed as part of a computer network or in a distributed computing environment such as the cloud. The various embodiments described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to client computing devices. The client computing devices can access the computing services or functionality via application program interfaces (APIs), web browsers, or other standalone or networked applications. Accordingly, aspects of the subscription-based diagnostic software service can be implemented based on such a cloud environment. For example, support system 120 can reside in the cloud environment such that the computer-executable instruction implementing the functionality thereof are executed with the aggregated computing resources provided by the plurality of physical computing devices. The cloud environment provides one or more methods of access to the support system 120, which are utilized by diagnostic application 112 on computing device 110. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 20:
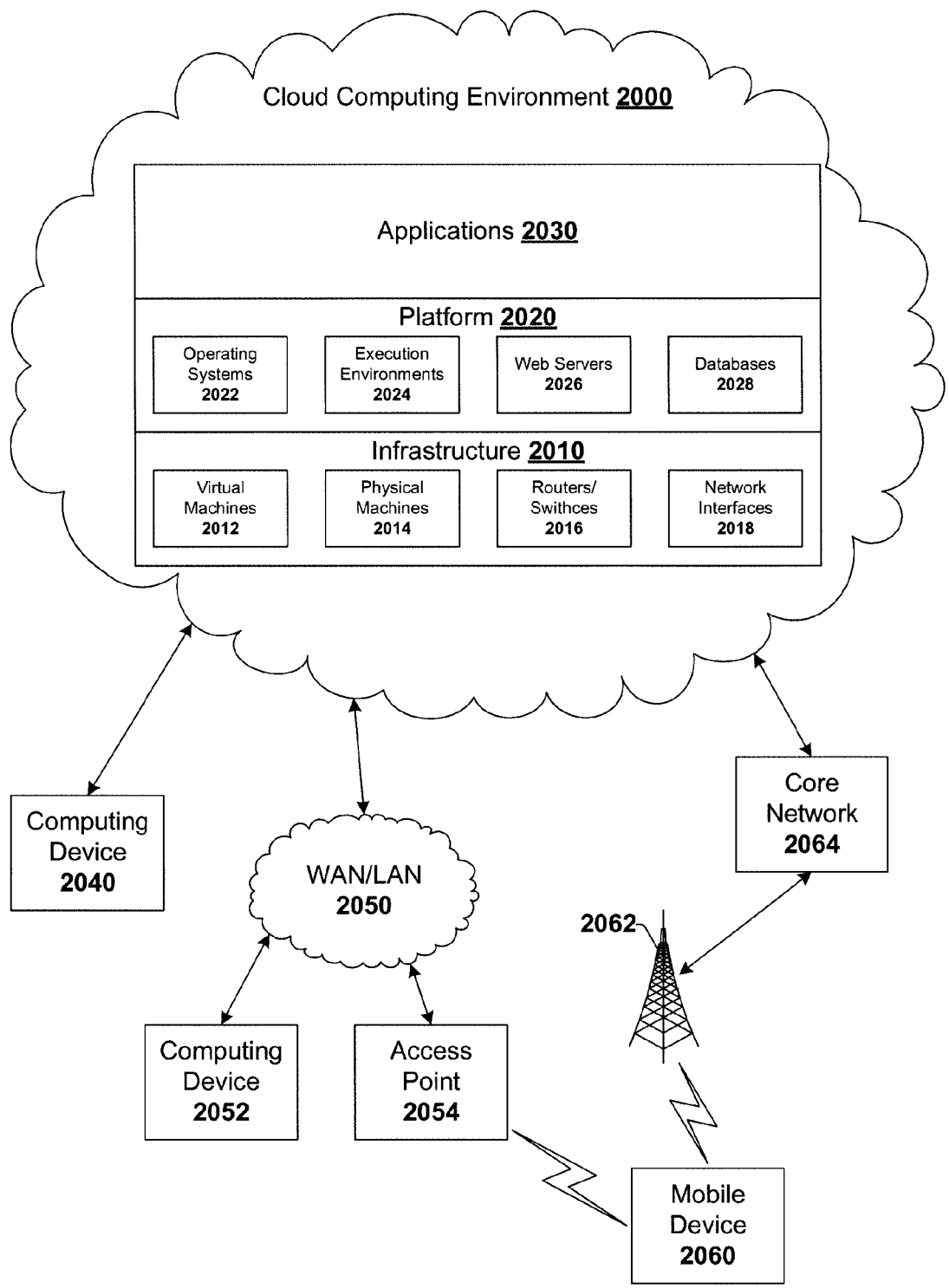
FIG. 20 is a block diagram representing an exemplary, non-limiting networked environment, including cloud or internet based, in which various embodiments described herein can be implemented.

FIG. 20 provides a schematic diagram of an exemplary networked or distributed computing environment, such as a cloud computing environment 2000. The cloud computing environment 2000 represents a collection of computing resources available, typically via the Internet, to one or more client devices. The cloud computing environment 2000 comprises various levels of abstraction: infrastructure 2010, a platform 2020, and applications 2030. Each level, from infrastructure 2010 to applications 2030 is generally implemented on top of lower levels, with infrastructure 2010 representing the lowest level.

Infrastructure 2010 generally encompasses the physical resources and components on which cloud services are deployed. For instance, infrastructure 2010 may include virtual machines 2012, physical machines 2014, routers/switches 2016, and network interfaces 2018. The network interfaces 2018 provide access to the cloud computing environment 2000, via the Internet or other network, from client devices such as computing devices 2040, 2052, 2060, etc. That is, network interfaces 2018 provide an outermost boundary of cloud computing environment 2000 and couple the cloud computing environment 2000 to other networks, the Internet, and client computing devices. Routers/switches 2016 couple the network interfaces 2018 to physical machines 2014, which are computing devices comprising computer processors, memory, mass storage devices, etc. Hardware of physical machines 2014 can be virtualized to provide virtual machines 2012. In an aspect, virtual machines 2012 can be executed on one or more physical machines 2014. That is, one physical machine 2014 can include a plurality of virtual machines 2012.

Implemented on infrastructure 2010, platform 2020 includes software that forming a foundation for applications 2030. The software forming platform 2020 includes operating systems 2022, programming or execution environments 2024, web servers 2026, and databases 2028. The software of platform 2020 may be configured to be installed on virtual machines 2012 and/or physical machines 2014.

Applications 2030 include user-facing software applications, implemented on platform 2020, that provide services to various client devices. In this regard, support system 120 or application server 920 of the diagnostic software service described herein are examples of application 2030. As illustrated in FIG. 20, client devices may include computing devices 2040, 2052 and mobile device 2060. Computing devices 2040, 2052 may be directly coupled to the Internet, and therefore the cloud computing environment 2000, or indirectly coupled to the Internet via a WAN/LAN 2050. The WAN/LAN 2050 may include an access point 2054 that enables wireless communications (e.g., WiFi) with mobile device 2060. In this regard, via access point 2054 and WAN/LAN 2050, mobile device 2060 may be configured to communicate wirelessly with the cloud computing environment 2000. Mobile device 2060 can also wirelessly communicate according to cellular technology such as, but not limited to, GSM, LTE, WiMAX, HSPA, etc. Accordingly, mobile device 2060 can wireless communicate with a base station 2062, which is coupled to a core network 2064 of a wireless communication provider. The core network 2064 includes a gateway to the Internet and, via the Internet, provides a communication path to the cloud computing environment 2000.

Exemplary Computing Environment

As mentioned, advantageously, the techniques described herein may be applied to any device where it is desirable to provide vehicle diagnostic functionality on a subscription basis. It can be understood, therefore, that handheld, portable and other computing devices and computing objects of all kinds are contemplated for use in connection with the various embodiments of an subscription-based diagnostic software service. Accordingly, the below general purpose computer described below in FIG. 21 is but one example of a computing device.

Embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 21:
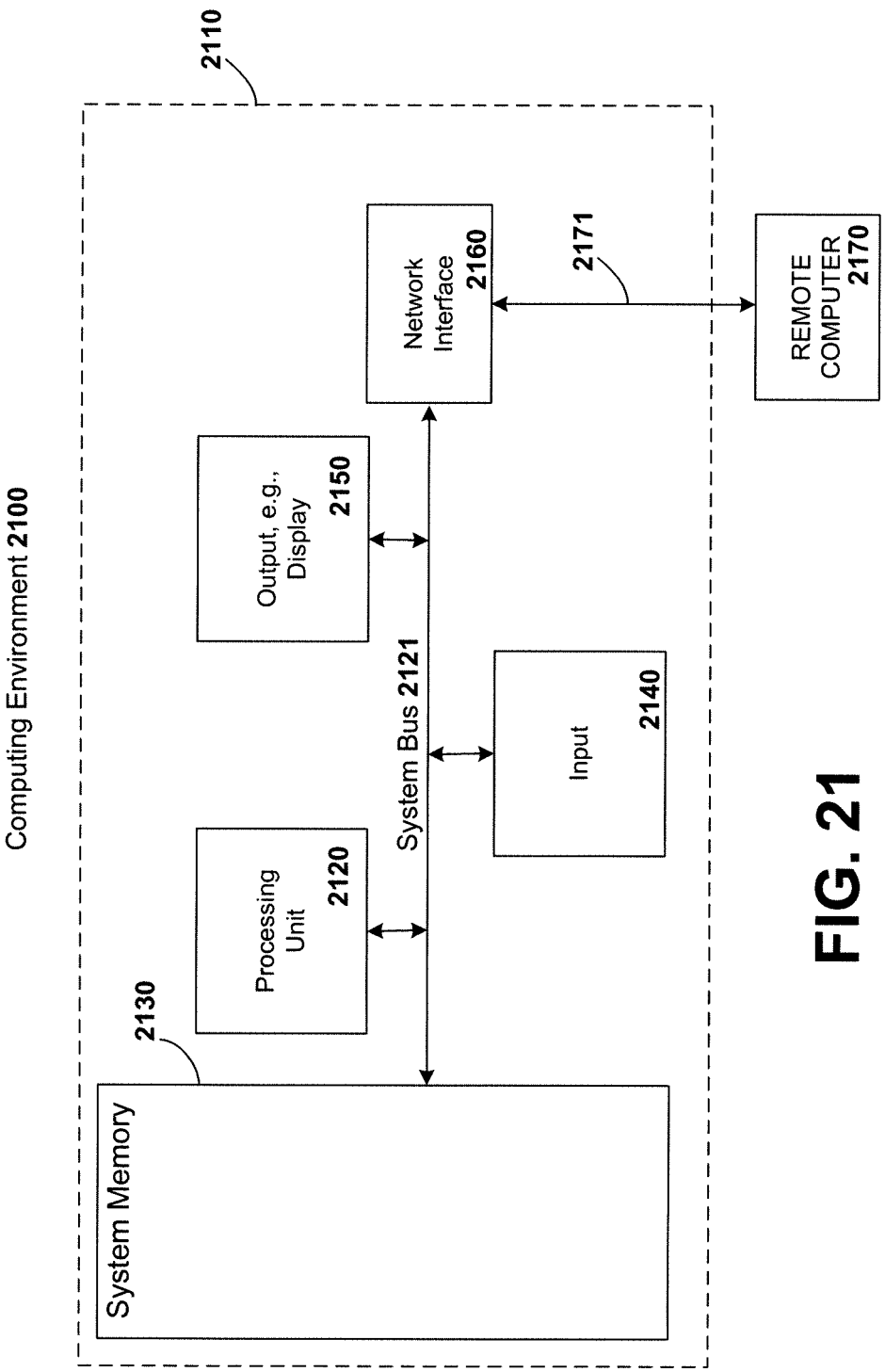
FIG. 21 is a block diagram representing an exemplary, non-limiting computing system or operating environment in which one or more aspects of various embodiments described herein can be implemented.

FIG. 21 thus illustrates an example of a suitable computing system environment 2100 in which one or aspects of the embodiments described herein can be implemented, although as made clear above, the computing system environment 2100 is only one example of a suitable computing environment and is not intended to suggest any limitation as to scope of use or functionality. In addition, the computing system environment 2100 is not intended to be interpreted as having any dependency relating to any one or combination of components illustrated in the exemplary computing system environment 2100.

With reference to FIG. 21, an exemplary device for implementing one or more embodiments includes a general purpose computing device in the form of a computer 2110. Components of computer 2110 may include, but are not limited to, a processing unit 2120, a system memory 2130, and a system bus 2122 that couples various system components including the system memory to the processing unit 2120.

Computer 2110 typically includes a variety of computer readable media and can be any available media that can be accessed by computer 2110. The system memory 2130 may include computer storage media in the form of volatile and/or nonvolatile memory such as read only memory (ROM) and/or random access memory (RAM). By way of example, and not limitation, system memory 2130 may also include an operating system, application programs, other program modules, and program data. According to a further example, computer 2110 can also include a variety of other media (not shown), which may include, without limitation, RAM, ROM, EEPROM, flash memory or other memory technology, compact disk (CD) ROM, digital versatile disk (DVD) or other optical disk storage, or other tangible and/or non-transitory media which can be used to store desired information.

A user is enabled to enter commands and information into the computer 2110 through input devices 2140. A monitor or other type of display device is also connected to the system bus 2122 via an interface, such as output interface 2150. In addition to a monitor, computers can also include other peripheral output devices such as speakers and a printer, which may be connected through output interface 2150.

The computer 2110 may operate in a networked or distributed environment using logical connections to one or more other remote computers, such as remote computer 2170. The remote computer 2170 may be a personal computer, a server, a router, a network PC, a peer device or other common network node, or any other remote media consumption or transmission device, and may include any or all of the elements described above relative to the computer 2110. The logical connections depicted in FIG. 21 include a network 2172, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to implement a subscription-based diagnostic software service.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile electronic communication device for use by a vehicle maintenance technician for motor vehicle maintenance, comprising:
   a user interface;
   a display; and
   a processor coupled to computer-readable storage medium on the mobile device having stored thereon computer-executable instructions for a subscription software application for use in maintenance of a motor vehicle, the subscription software application, when executed by the processor, configuring the processor to:
      output, on the display of the mobile device, a list of diagnostic software modules stored via an integrated module of the mobile device or an extension module of the mobile device, the list of diagnostic software modules available for utilization by the vehicle maintenance technician for analysis of vehicle data associated with the motor vehicle, with the available diagnostic software modules being adapted for utilization with a corresponding motor vehicle characterized by at least one vehicle characteristic selected from a group of vehicle characteristics comprising vehicle manufacturer, model, model year, intended country of use, intended country of sale and vehicle subsystem;
      receive, via the user interface of the mobile device, a selection of a desired diagnostic software module by a user from among the list of diagnostic software modules;
      receive a commitment of payment for access to the desired diagnostic software module;
      communicate the selection of the desired diagnostic software module to a first system, with the first system being remote from the motor vehicle to be maintained;
      communicate the commitment of payment to a second system, with the second system being remote from the motor vehicle to be maintained; and
      receive the selected diagnostic software module, as a download, to enable operation, in response to an authorization signal, of the desired diagnostic software module, when located in a local area relative to the motor vehicle to be maintained, for generating an analysis result from an analysis of at least a portion of the vehicle data and for outputting the analysis result to the display.

2. The mobile device of claim 1, wherein the first and second remote systems constitute a single remote system such that the subscription software application configures the processor to communicate the selection of the desired diagnostic software module and the commitment of payment to the single remote system.

3. The mobile device of claim 1, wherein the first remote system and the second remote system are two different remote systems.

4. The mobile device of claim 1, further comprising a communication interface for receiving data associated with a motor vehicle,
   wherein the communication interface comprises a receiver configured to receive the vehicle data transmitted by at least one control unit of the motor vehicle.

5. The mobile device of claim 1, further comprising a communication interface for receiving data associated with a motor vehicle,
   wherein the communication interface is configured to receive at least some of the vehicle data from data storage remote from the motor vehicle.

6. The mobile device of claim 1, further comprising a communication interface for receiving data associated with a motor vehicle,
   wherein the communication interface comprises a receiver configured to receive at least some of the vehicle data associated with the motor vehicle transmitted by a vehicle communication interface operatively coupled to the motor vehicle.

7. The mobile device of claim 1, the subscription software application further configuring the processor to store the desired diagnostic software module on the computer-readable storage medium of the mobile device.

8. The mobile device of claim 1, wherein the desired diagnostic software module is stored on the computer-readable storage medium of the mobile device, and wherein only when the mobile device receives the authorization signal is access granted for the use of the desired diagnostic software module via the mobile device.

9. The mobile device of claim 1, the subscription software application further configuring the processor to:
   communicate, to a remote server, a request for analysis of at least some of the vehicle data by the desired diagnostic software module;
   receive analysis results from the remote server at the mobile device; and
   output the analysis results to the display.

10. The mobile device of claim 1, wherein the authorization signal enables the operation of the desired diagnostic software module for a predetermined number of uses.

11. The mobile device of claim 1, wherein the authorization signal enables the operation of the desired diagnostic software module for a predetermined period of time.

12. Non-transitory, computer-readable storage media having stored thereon computer-executable instructions for a diagnostic software service for use in maintenance of a motor vehicle, the computer-executable instructions comprising:
   a first set of instructions for the diagnostic software service that, when executed by a first processor, configures the first processor to:

(1) display a list of diagnostic software modules available for use to analyze vehicle data associated with the motor vehicle and to generate analysis results adapted for use in maintenance of the motor vehicle, with the available diagnostic software modules being adapted for utilization with a corresponding motor vehicle characterized by at least one vehicle characteristic selected from a group of vehicle characteristics comprising vehicle manufacturer, model, model year, intended country of use, intended country of sale and vehicle subsystem wherein the list of diagnostic software modules are stored via an integrated module of the first processor or an extension module of the first processor, (2) receive a selection of a desired diagnostic software module by a user from among the list of diagnostic software modules available, and (3) communicate the selection of the desired diagnostic software module to a first system, with the first system being remote from the motor vehicle to be maintained;

a second set of instructions for the diagnostic software service that, when executed by a second processor, configures the second processor to:

(4) receive a commitment of payment for access to the desired diagnostic software module, and (5) communicate the commitment of payment to a second system, with the second system being remote from the motor vehicle to be maintained;

a third set of instructions for the diagnostic software service that, when executed by the first processor in a local area relative to the motor vehicle to be maintained, configures the first processor to:

(6) receive vehicle data associated with a motor vehicle, and (7) receive the selected diagnostic software module, as a download, and to operate the desired diagnostic software module to analyze the vehicle data to generate analysis results adapted for use in the maintenance of the motor vehicle; and a fourth set of instructions for the diagnostic software service that, when executed by the first processor in a local area relative to the motor vehicle to be maintained, configures the first processor to:

(8) receive the analysis results generated from analysis of the vehicle data, and (9) output the analysis results to a display associated with the first processor and adapted for viewing by vehicle maintenance technician personnel when located in a local area relative to the motor vehicle to be maintained.

13. The computer-readable storage media of claim 12, wherein the fourth set of instructions are executable by a processor of a mobile electronic communication device having a user interface and a display, the processor of the mobile device constituting at least the first processor.

14. The computer-readable storage media of claim 12 wherein the first set, the second set, the third set, and the fourth set of instructions are respectively stored on a computer-readable storage medium to be executable by a single processor constituting the first processor and the second processor.

15. The computer-readable storage media of claim 12, the computer-executable instructions further comprising a fifth set of instructions of the diagnostic software service that, when executed by a third processor, configures the third processor to enable operation of the desired diagnostic software module responsive to the selection of the desired diagnostic software module and the commitment of payment.

16. A non-transitory, computer-readable storage medium having stored thereon computer-executable instructions for enabling operation of a diagnostic software module for use in maintenance of a motor vehicle, the computer-executable instructions comprising:

a software application that, when executed by a processor, configures the processor to:

output a list of diagnostic software modules stored via an integrated module of the processor or an extension module of the processor, the list of diagnostic software available for utilization by a vehicle maintenance technician for analysis of vehicle data associated with a motor vehicle, with the available diagnostic software modules being adapted for utilization with a corresponding motor vehicle characterized by at least one vehicle characteristic selected from a group of vehicle characteristics comprising vehicle manufacturer, model, model year, intended country of use, intended country of sale and vehicle subsystem;

receive a selection of a desired diagnostic software module by a user from among the list of diagnostic software modules;

receive a commitment of payment for access to the desired diagnostic software module;

receive the desired diagnostic software module as a download; and enable operation of the desired diagnostic software module via a mobile electronic communication device having a user interface and a display, to generate analysis results in a local area relative to the motor vehicle to be maintained based on at least a portion of the vehicle data for output to the display of the mobile device wherein the software application is executable by the processor and the processor is a computer processor of the mobile device.

17. The computer-readable storage medium of claim 16, wherein the software application further configures the computer processor of the mobile device to receive an authorization signal and to enable access to the desired diagnostic software responsive to the authorization signal.

18. The computer-readable storage medium of claim 16, wherein the software application further configures the computer processor of the mobile device to receive, with a communication interface of the mobile device, at least a portion of the vehicle data transmitted from the motor vehicle.

19. The computer-readable storage medium of claim 16, wherein the software application further configures the computer processor of the mobile device to obtain at least some of the vehicle data from data storage remote from the motor vehicle.

20. The computer-readable storage medium of claim 16, wherein the software application further configures the processor to:

communicate the selection of the desired diagnostic software module to a first remote system; and communicate the commitment of payment to a second remote system.

21. The computer-readable storage medium of claim 20, wherein the software application further configures to the processor to communicate an identifier associated with the mobile device to at least one of the first remote system or the second remote system to enable the operation of the diagnostic software via the mobile device.

22. The computer-readable storage medium of claim 20, wherein the first and second remote systems constitute a single remote system such that the software application further configures the processor to communicate the selection of the desired diagnostic software module and the commitment of payment to the single remote system.

23. The computer-readable storage medium of claim 20, wherein the software application further enables the processor to communicate a signal for authorization to debit an amount from an account of credits, constituting the commitment of payment, with a credit being exchangeable for access to the desired diagnostic software module.

24. The computer-readable storage medium of claim 16, wherein the software application further enables the processor to communicate a request to a server configured to support the operation of the desired diagnostic software module, the request instructing the server to enable access to the desired diagnostic software module via the mobile device.

25. The computer-readable storage medium of claim 16, wherein the commitment of payment is indicative of a monetary sum that enables a predetermined number of uses of the desired diagnostic software module.

26. The computer-readable storage medium of claim 16, wherein the commitment of payment is indicative of a monetary sum that enables use of the diagnostic software module for a predetermined period of time.

27. A non-transitory, computer-readable storage medium having stored thereon computer-executable instructions for a diagnostic software service hosted on a remote server for use in maintenance of a motor vehicle, the computer-executable instructions comprising:
a software application configured to be executed by a processor to enable the processor to:
receive a selection of a desired diagnostic software module made by a user, from a list of available diagnostic software modules, the list of available diagnostic software modules provided by the processor and stored via an integrated module of the processor or an extension module of the processor, with the available diagnostic software modules being adapted for utilization with a corresponding motor vehicle characterized by at least one vehicle characteristic selected from a group of vehicle characteristics comprising vehicle manufacturer, model, model year, intended country of use, intended country of sale and vehicle subsystem;
receive a commitment of payment for use of the desired diagnostic software module;
receive vehicle data associated with a motor vehicle;
receive the desired diagnostic software module as a download;
analyze the vehicle data in a local area relative to the motor vehicle to be maintained to generate analysis results via the desired diagnostic software module; and
communicate the analysis results to a display of a mobile electronic communication device and adapted for viewing by vehicle maintenance technician personnel when located adjacent the motor vehicle wherein the mobile device includes the processor.

* * * * *